(12) United States Patent
Cattell et al.

(10) Patent No.: US 8,117,153 B2
(45) Date of Patent: Feb. 14, 2012

(54) SYSTEMS AND METHODS FOR A DISTRIBUTED CACHE

(75) Inventors: Roderic G. Cattell, Tiburon, CA (US); Craig L. Russell, Mountain View, CA (US)

(73) Assignee: Oracle America, Inc., Redwood City, CA (US)

( * ) Notice: Subject to any disclaimer, the term of this patent is extended or adjusted under 35 U.S.C. 154(b) by 164 days.

(21) Appl. No.: 11/392,326

(22) Filed: Mar. 28, 2006

(65) Prior Publication Data

US 2007/0239791 A1   Oct. 11, 2007

(51) Int. Cl.
 G06F 7/00   (2006.01)
 G06F 17/00   (2006.01)
(52) U.S. Cl. ........................ 707/610; 707/636
(58) Field of Classification Search .......... None
 See application file for complete search history.

(56) References Cited

U.S. PATENT DOCUMENTS

| | | | | |
|---|---|---|---|---|
| 6,263,369 B1* | 7/2001 | Sitaraman et al. | ........... | 709/225 |
| 6,317,778 B1* | 11/2001 | Dias et al. | .................... | 709/214 |
| 6,792,436 B1* | 9/2004 | Zhu et al. | ...................... | 707/203 |
| 6,944,711 B2* | 9/2005 | Mogi et al. | ..................... | 711/113 |
| 7,120,651 B2* | 10/2006 | Bamford et al. | ............... | 707/201 |
| 7,254,580 B1* | 8/2007 | Gharachorloo et al. | .............. | 1/1 |
| 7,395,258 B2* | 7/2008 | Altinel et al. | ..................... | 707/3 |
| 7,577,754 B2* | 8/2009 | Garcia-Luna-Aceves et al. | ............................ | 709/238 |
| 7,725,559 B2* | 5/2010 | Landis et al. | .................. | 709/215 |
| 2003/0217081 A1* | 11/2003 | White et al. | .................. | 707/203 |
| 2004/0215883 A1* | 10/2004 | Bamford et al. | ............. | 711/129 |
| 2005/0050106 A1* | 3/2005 | Wenner et al. | ................ | 707/200 |
| 2005/0165731 A1* | 7/2005 | Funk | ................................ | 707/1 |
| 2005/0278387 A1* | 12/2005 | Kamada et al. | ............... | 707/200 |
| 2005/0289198 A1* | 12/2005 | Todd | ............................. | 707/204 |
| 2006/0026154 A1* | 2/2006 | Altinel et al. | ..................... | 707/5 |
| 2006/0190243 A1* | 8/2006 | Barkai et al. | ...................... | 704/8 |
| 2007/0055647 A1* | 3/2007 | Mullins et al. | .................... | 707/2 |
| 2007/0143344 A1* | 6/2007 | Luniewski et al. | ........ | 707/104.1 |
| 2007/0198685 A1* | 8/2007 | Phatak | .......................... | 709/223 |

* cited by examiner

*Primary Examiner* — Rehana Perveen
*Assistant Examiner* — Raheem Hoffler
(74) *Attorney, Agent, or Firm* — Marsh Fischmann & Breyfogle LLP; Karl A. Dierenbach; Kent A. Lembke

(57) ABSTRACT

Methods, systems, and articles of manufacture consistent with the present invention provide managing a distributed database cache. A database cache is provided. The database cache is distributed over at least two data processing systems.

18 Claims, 37 Drawing Sheets

SYSTEMS AND METHODS FOR A DISTRIBUTED CACHE

CROSS-REFERENCE TO RELATED APPLICATIONS

This Application is related to the following U.S. Patent Applications, which are filed concurrently with this Application, and which are incorporated herein by reference to the extent permitted by law:

Ser. No. 11/392,304, entitled "Systems and Methods for a Distributed In-Memory Database;"

Ser. No. 11/393,162, entitled "Systems and Methods for a Distributed In-Memory Database and Distributed Cache;" and Ser. No. 11/393,163, entitled "Systems and Methods for Synchronizing Data in a Cache and Database."

FIELD OF THE INVENTION

The present invention relates to computer-implemented databases, and in particular, to distributed in-memory databases and database caches.

BACKGROUND OF THE INVENTION

As memory becomes less expensive, an increasing number of databases may fit in a computer's main memory. These in-memory databases typically have been managed by relational database management systems ("RDBMS.") However, RDBMS performance is limited even with large amounts of main memory. In particular, a program may need to translate an application's object representation of data (e.g., Java™ object representation) into and out of a relational representation for the relational database. In addition, RDBMSs generally cache databases on database servers, requiring several layers of software and network protocol to access from an application. Data is typically not cached in the same virtual memory as the application, except for small or short-lived caches in a database driver. Further, a RDBMS is typically optimized for data on disk, not in memory. For example, a typical RDBMS uses b-trees, database pages, locking, and logging. These are optimized to minimize disk access rather than central processing unit ("CPU") time or memory space.

Another problem with traditional RDBMS caches is update speed. There is a bottleneck in the requirement to write through to the backing database when a transaction is committed to the backing database. The data must be transferred from the client that made the update all the way through to the server's disk before acknowledging the commit.

SUMMARY OF THE INVENTION

Methods, systems, and articles of manufacture consistent with the present invention provide a memory-based relational data store that can be a cache to a backend relational database or as a standalone in-memory database. The memory-based relational data store may be distributed, for example, over a plurality of data processing systems or processes. For purposes of this invention, a data store that is in-memory is located in directly-addressable memory and not on disk. The store can run in the same virtual memory as an application, or it can run as a separate process. The data store provides extremely fast reads, because it avoids the overhead of RDBMS layers. Further, the data store provides extremely fast updates, because updates need not be pushed to disk if the store is mirrored across two machines. A transaction commit can be performed by updating both the primary and standby stores.

When the data store acts as a cache for backend databases, high commit performance can be achieved with transactional integrity, compared to conventional single-system caches that require data to be transferred from the client that made the update all the way through to the server's disk before acknowledging a commit. Further, when the data store acts as a cache, it either writes the committed data through to a backing store, writes the data to a standby replica and thus avoids write through to a disk, or may delay writing to the backing store.

In accordance with methods consistent with the present invention, a method in a data processing system having a plurality of independent sub data processing systems is provided. The data processing system has a program for managing a database. The method comprises the steps of: providing a database cache; and distributing the database cache over at least two of the plurality of sub data processing systems.

In accordance with methods consistent with the present invention, a method in a data processing system having a plurality of independent sub data processing systems is provided. The data processing system has a program for managing a database. The method comprises the steps of: providing a database cache that is distributed over at least two of the plurality of sub data processing systems; and accessing the database cache using a plurality of data models.

In accordance with methods consistent with the present invention, a method in a data processing system having a plurality of independent sub data processing systems is provided. The data processing system has a program for managing a database. The method comprises the steps of: providing a database cache; and performing transactions between the database cache and a plurality of databases.

In accordance with articles of manufacture consistent with the present invention, a computer-readable medium containing instructions that cause a program to perform a method for managing a database is provided. The data processing system has a plurality of independent sub data processing systems. The method comprises the steps of: providing a database cache; and distributing the database cache over at least two of the plurality of sub data processing systems.

In accordance with systems consistent with the present invention, a data processing system is provided. The data processing system comprises: a plurality of independent sub data processing systems, each sub data processing system having a memory and a processing unit, wherein a first of the sub data processing systems has a program that provides a database cache, and distributes the database cache over at least two of the plurality of sub data processing systems, the processing unit of the first sub data processing running the program.

Other systems, methods, features, and advantages of the invention will become apparent to one with skill in the art upon examination of the following figures and detailed description. It is intended that all such additional systems, methods, features, and advantages be included within this description, be within the scope of the invention, and be protected by the accompanying drawings.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

DETAILED DESCRIPTION OF THE INVENTION

Reference will now be made in detail to an implementation consistent with the present invention as illustrated in the accompanying drawings. Wherever possible, the same reference numbers will be used throughout the drawings and the following description to refer to the same or like parts.

Figure 1:
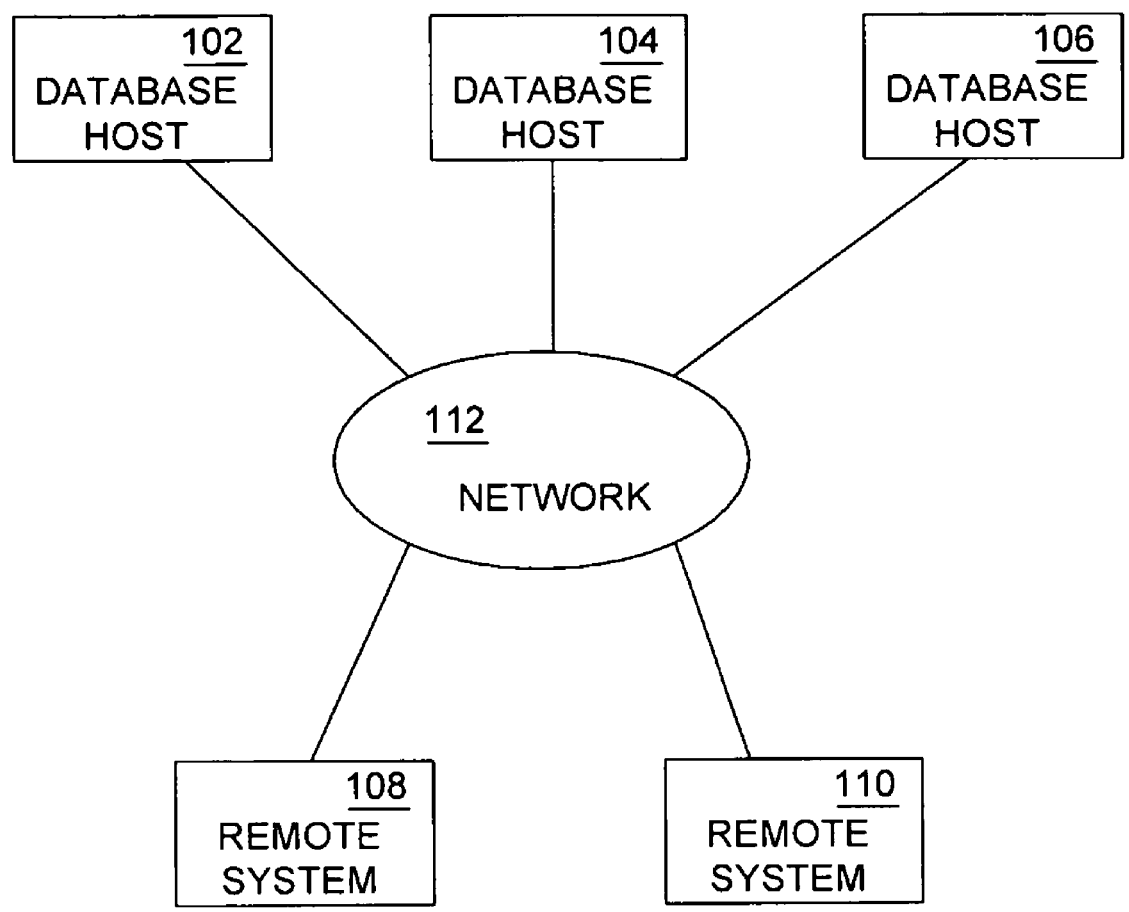
FIG. 1 shows a block diagram illustrating a data processing system suitable for use with methods and systems consistent with the present invention.

Methods, systems, and articles of manufacture consistent with the present invention provide a memory-based relational data store that can act as a cache to a backend relational database or as a standalone in-memory database. The store can run in the same virtual memory as an application, or it can run as a separate process. FIG. 1 depicts a block diagram of a data processing system 100 suitable for use with methods and systems consistent with the present invention. Data processing system 100 is referred to hereinafter as "the system." The system includes one or more database host systems 102, 104, and 106, such as servers. The database host computers can be accessed by one or more remote systems 108 and 110 (e.g., client workstations) via a network 112. The network is a network suitable for use with methods and systems consistent with the present invention, such as a local area network or wide area network. In the illustrative embodiment, the network is a local area network.

Figure 2:
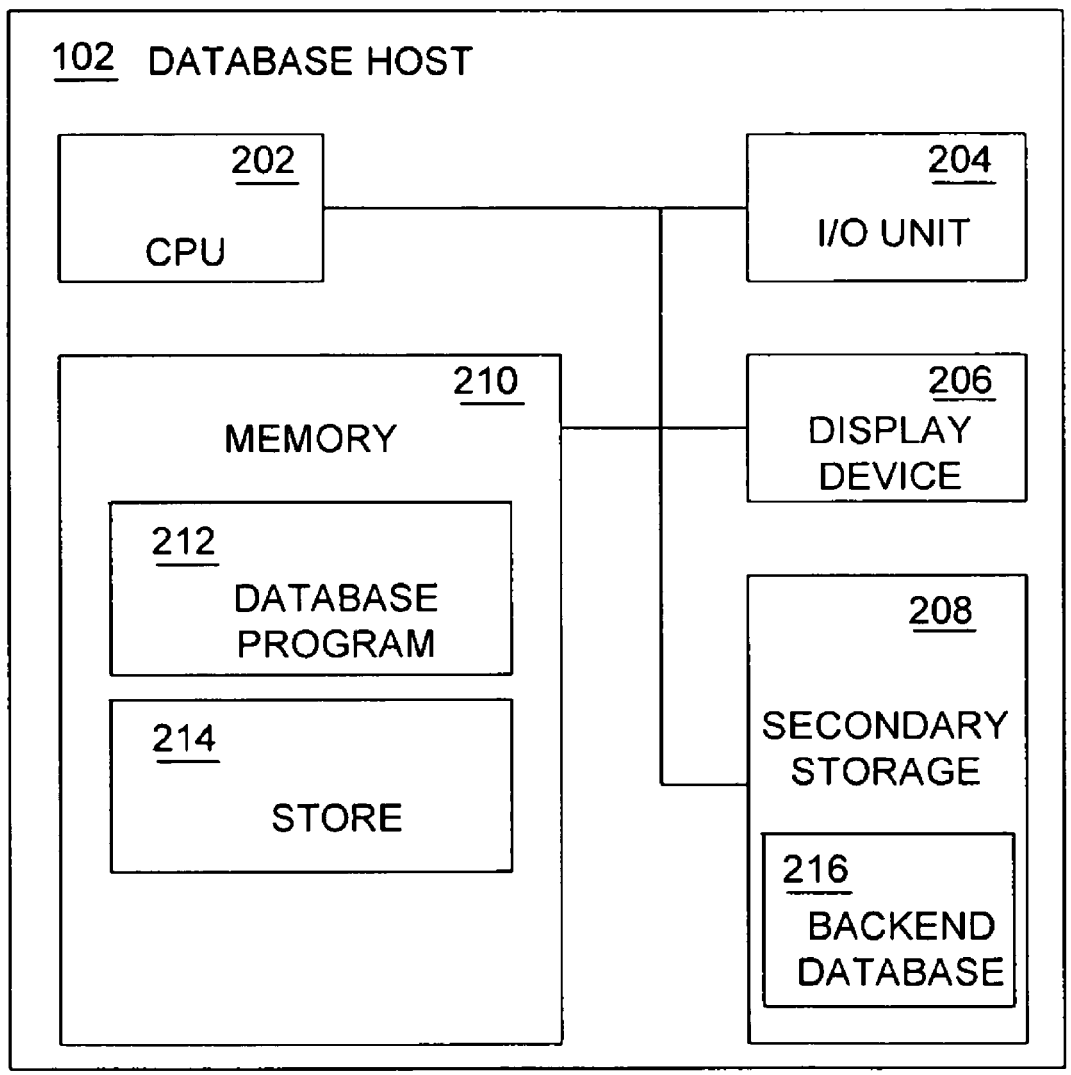
FIG. 2 is a block diagram illustrating a database host system suitable for use with methods and systems consistent with the present invention.
Figure 3:
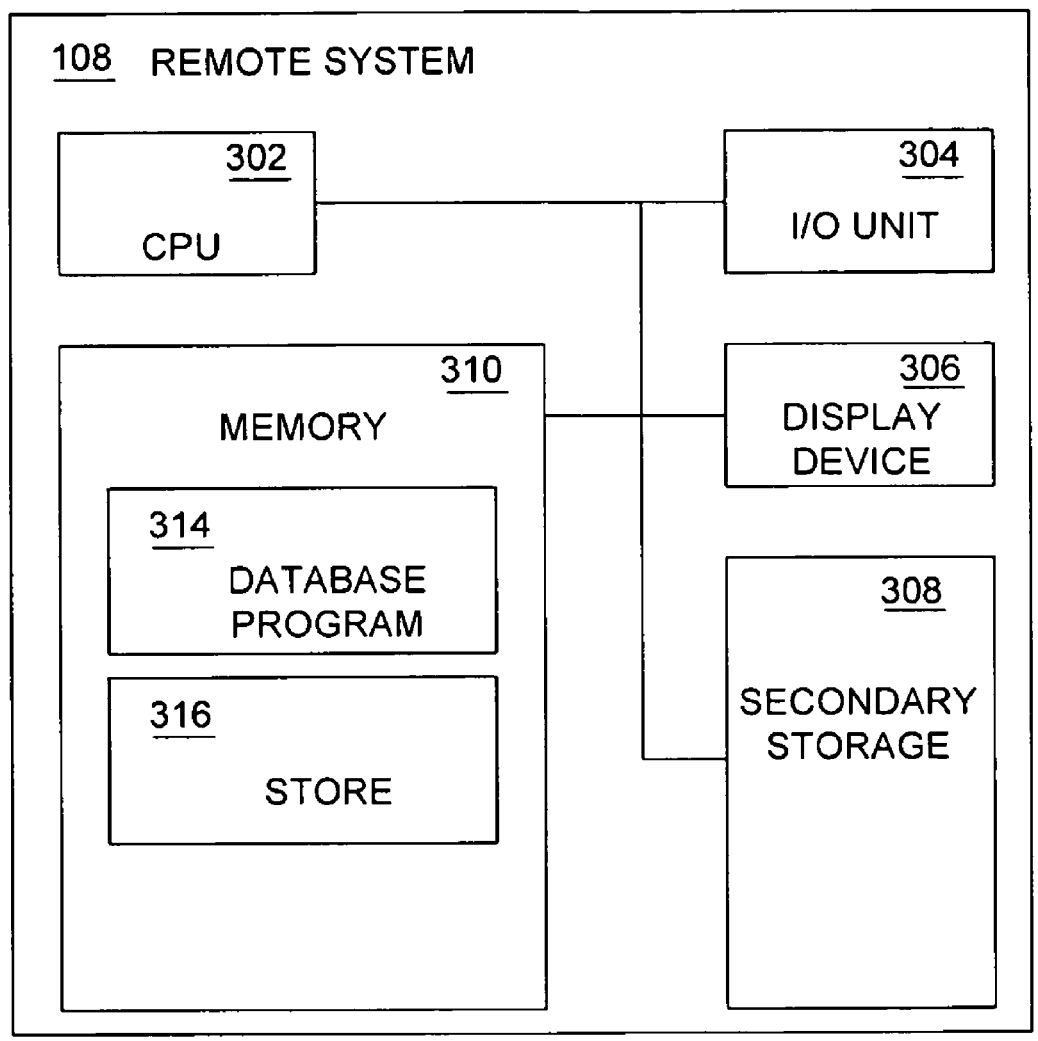
FIG. 3 is a block diagram illustrating a remote system suitable for use with methods and systems consistent with the present invention.

FIGS. 2 and 3 depict more detailed views of illustrative database host systems and remote systems, respectively. FIG. 2 depicts a more detailed view of a database host system, such as database host system 102. The database host system is, for example, a Sun SPARC® data processing system running the Solaris® operating system. One having skill in the art will appreciate that hardware and programs other than those described in the illustrative examples can be implemented. Sun, SPARC, Java, the Sun logo, Solaris, StarOffice, and Sun ONE are trademarks or registered trademarks of Sun Microsystems, Inc., Palo Alto, Calif., in the United States and other countries. Other names used herein are the property of their respective owners.

The illustrative database host system comprises a central processing unit (CPU) 202, an input/output (I/O) unit 204, a display device 206, a secondary storage device 208, and a memory 210. The database host system may further comprise standard input devices such as a keyboard, a mouse or a speech processing means (each not illustrated). Memory 210 may comprise a database program 212 and a store 214 which may act as a cache for a backend relational database 216 or may act as an in-memory database. Store 214 may comprise one or more sub-stores, each of which can act as a cache or as an in-memory database. As will be described in more detail below, the cache 214 may be distributed across one or more database host systems or processes. In this case, there is a cache component in main memory on each relevant database host system. One of skill in the art will appreciate that each program and module described herein can be a stand-alone program and can reside in memory on a data processing system other than the described system. The program and modules may comprise or may be included in one or more code sections containing instructions for performing their respective operations. While the programs and modules are described as being implemented as software, the present implementation may be implemented as a combination of hardware and software or hardware alone. Also, one having skill in the art will appreciate that the programs and modules may comprise or may be included in a data processing device, which may be a client or a server, communicating with described system.

Although aspects of methods, systems, and articles of manufacture consistent with the present invention are depicted as being stored in memory, one having skill in the art will appreciate that these aspects may be stored on or read from other computer-readable media, such as secondary storage devices, like hard disks, floppy disks, and CD-ROM; a carrier wave received from a network such as the Internet; or other forms of ROM or RAM either currently known or later developed. Further, although specific components of system 100 have been described, one skilled in the art will appreciate that a data processing system suitable for use with methods, systems, and articles of manufacture consistent with the present invention may contain additional or different components.

One having skill in the art will appreciate that the database host systems and remote systems can themselves also be implemented as client-server data processing systems. In that case, a program or module can be stored on, for example, a database host system as a client, while some or all of the steps of the processing of the program or module described below can be carried out on a remote server, which is accessed by the database host system over the network. The remote server can comprise components similar to those described above with respect to the database host system, such as a CPU, an I/O, a memory, a secondary storage, and a display device.

FIG. 3 depicts an illustrative remote system, such as remote system 108 or 110. In the illustrated example, remote system 108 is represented. The remote system can be, for example, a Sun SPARC® data processing system running the Solaris® operating system. The partner system comprises a central processing unit (CPU) 302, an input/output (I/O) unit 304, a display device 306, a secondary storage device 308, and a memory 310. The remote system may further comprise standard input devices such as a keyboard, a mouse or a speech processing means (each not illustrated). Memory 310 may comprise a database program 314 and data 316. Memory 310 may comprise a database program 314 and a store 316 which may act as a cache for a backend relational database 316 or may act as an in-memory database. Store 316 may comprise one or more sub-stores, each of which can act as a cache or as an in-memory database. As will be described in more detail below, the cache 316 may be distributed across one or more database host systems or processes. In this case, there is a cache component in main memory on each relevant database host system.

Figure 4:
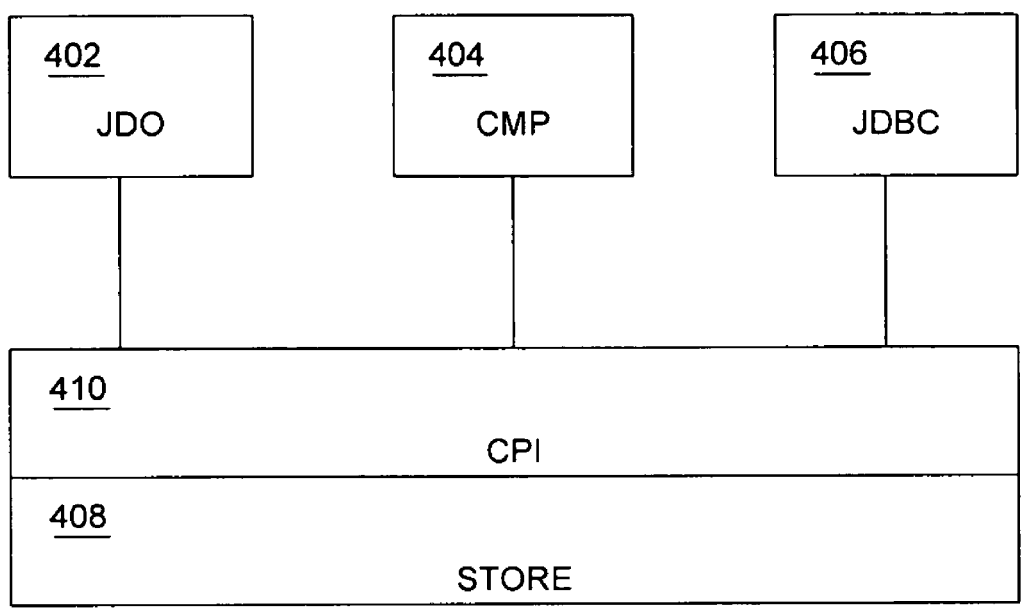
FIG. 4 is a block diagram showing illustrative persistence interfaces.

As shown in FIG. 4, one or more persistence interfaces 402, 404, and 406 may be used to access store 408. In the illustrative example, the persistence interfaces include Java Data Objects ("JDO") 402, EJB Container Managed Persistence ("CMP") 404, and Java Database Connectivity ("JDBC") 406. Other persistence interfaces may be used, such as the JAXB persistence interface. Persistence interfaces are known to one having skill in the art and will not be described in more detail herein. The persistence interface uses a cache programmatic interface ("CPI") 410 to access store 408. A user of the CPI, such as JDO, CMP, or JDBC, is referred to as a "CPI adaptor" herein.

The store's data model is an in-memory relational model. The value of this approach is that it is portable across virtual machines and can be mapped directly to a relational database schema when the store is used as a cache. Using this approach enables methods, systems, and articles of manufacture consistent with the present invention to take advantage of the strengths of the relational model in terms of flexibility and expressive power without having to pay the cost and complexity incurred by algorithms and data structures that traditional relational databases are forced to use to reduce the number of disk accesses.

In the illustrative example, the store is relational and does not perform object-relational mapping. Therefore, a CPI adaptor (e.g., a JDO or CMP CPI adaptor) that exposes an object interface to its users, performs object-relational mapping of data that is sent to the store or that has been retrieved from the store via the CPI adaptor. Object-relational mapping is known in the art and will not be described further herein. A description of object-relational mapping may be found in Christian Bauer, et al., *Hibernate in Action*, ISBN 193239415X, which is incorporated herein by reference. Further, data may be stored in standard relational form, using tables and rows.

Figure 5:
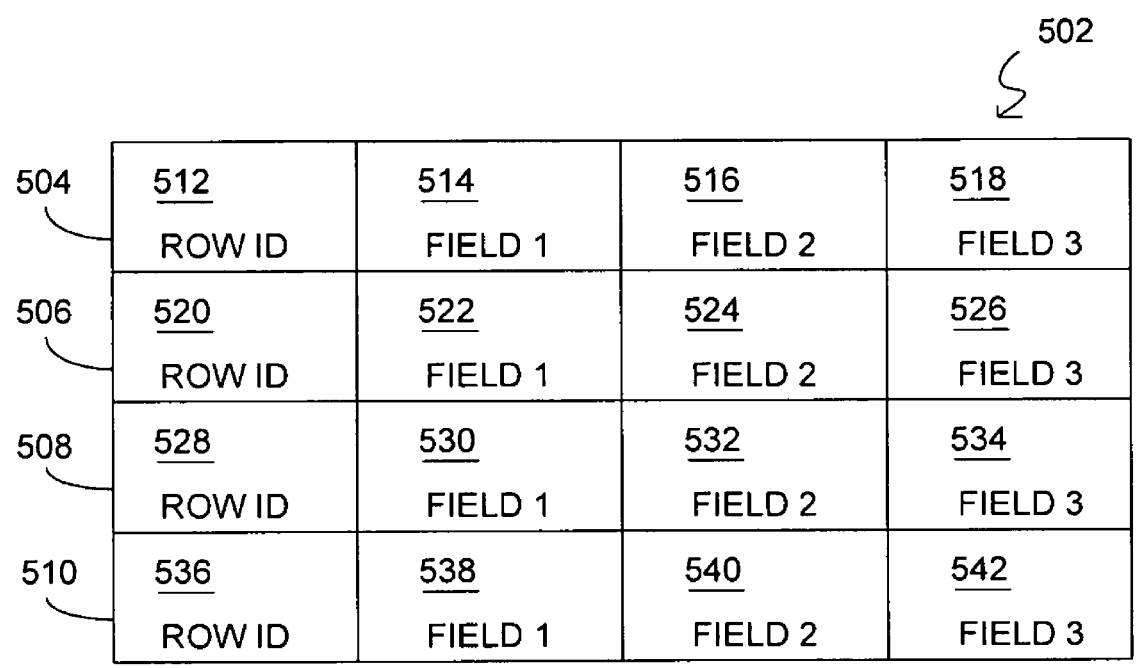
FIG. 5 is a block diagram of an illustrative database table.

FIG. 5 depicts an illustrative table 502. Rows 504-510 are each assigned a unique id. The unique id may be viewed as a primary key for that row. This unique id may be provided by the CPI adaptor, or it may be generated by the user, such as the programmer. The data in a row is comprised of a row id and a collection of fields. In the illustrative example, row 1 includes row id 512 and fields 514-518; row 2 includes row id 520 and fields 522-526; row 3 includes row id 528 and fields 530-534; and row 4 includes row id 536 and field 538-542. The fields can include a variety of data and datatypes. For example, the fields may support text, integers, and Java types, including primitive types and wrappers, arrays of primitive types and wrappers, Date (such as java.sql and java.util Date types), String, and Serializable, or more complex types that are stored as binary large objects or character large objects.

Records can be stored in a variety of manners. In a first illustrative approach, each record is stored as an object array, where each field of the record is an element in the array. In the illustrative example, an illustrative CPI adaptor uses Java types and thus the access of fields in a record can be very fast, and would not require conversion or data copy. In a second illustrative approach, each record is stored in a compact byte array. The array may have a header, which provides offsets for each field, and each field is stored as a series of bytes rather than as a Java object. For this approach, the CPI adaptor converts between a byte array representation and a Java object representation. This approach saves space compared to the first approach, and also provides for fast recovery and repair by allowing the creation of a map of the data image into a local shared memory segment. Further, by using remote direct memory access ("RDMA"), the data image can be sent to another process' memory space to enable fast cross-machine recovery. Faster recovery can improve the availability of the system. For example, communication between components of a cache or in-memory database may be implemented using RDMA.

Figure 6:
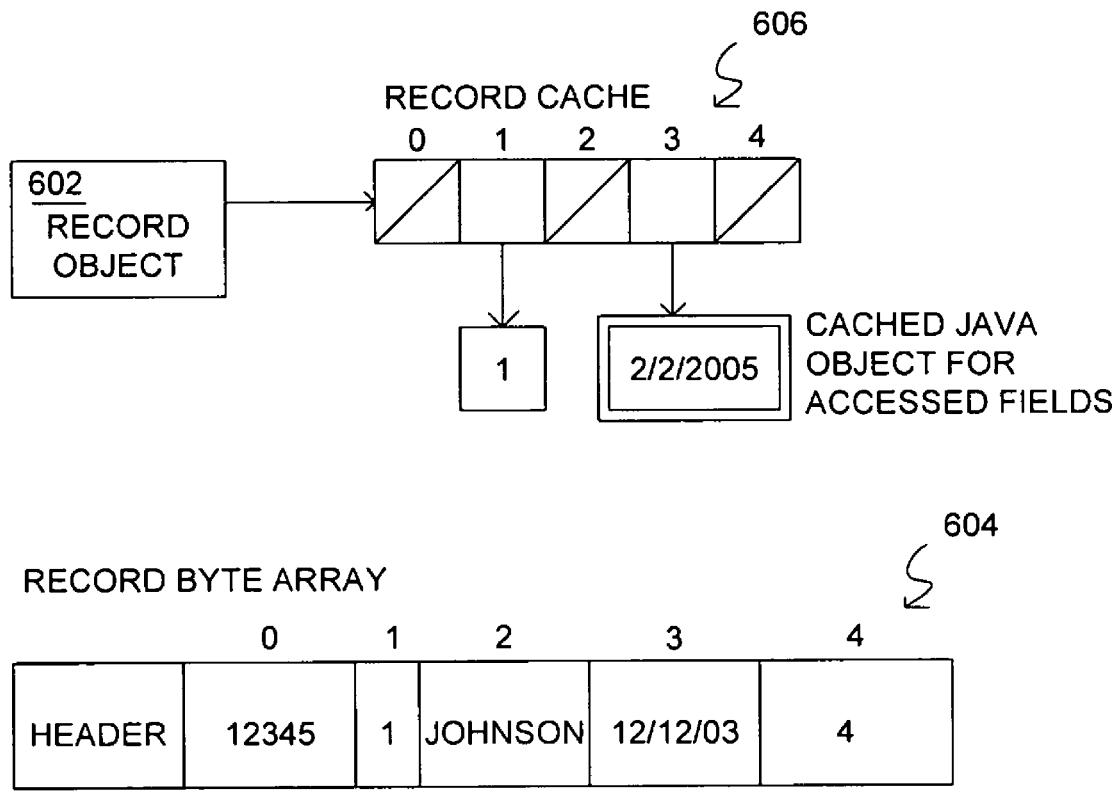
FIG. 6 is a functional block diagram showing storing data in a record cache.

A third illustrative approach is a hybrid of the first and second approaches. Referring to FIG. 6 as an example, in the third approach, a record object 602 is used to read and write fields within a record. The record object provides an external interface to the underlying record storage. Access to record data is through the record object. The record object stores committed records in a byte array format in a record byte array 604. The record object includes an object array, which is referred to herein as a record cache 606. Each element of record cache 606 represents a field in record byte array 604.

Within a transaction, when a field is first accessed, either for a read or a write, the record object converts the field into its Java object representation, and this is "cached" within the record cache. Subsequent accesses to that field are done to this cached version. This cached representation represents the "after image" of a record for a given transaction. Fields in the record that have not been accessed have null references in the record cache, as represented by the diagonal line through the array element. Fields that have been accessed have references to Java objects for that field. These objects are referred to herein as field objects. In the illustrative example, fields 1 and 3 have been accessed. Field 3 has been modified, and is marked as dirty (as represented by the solid and dashed lines). As shown, the record cache provides the after image for this record within the transaction.

The record object creates a separate record cache for each transaction. In an alternative embodiment, unmodified field objects may be shared across transactions.

Figure 7:
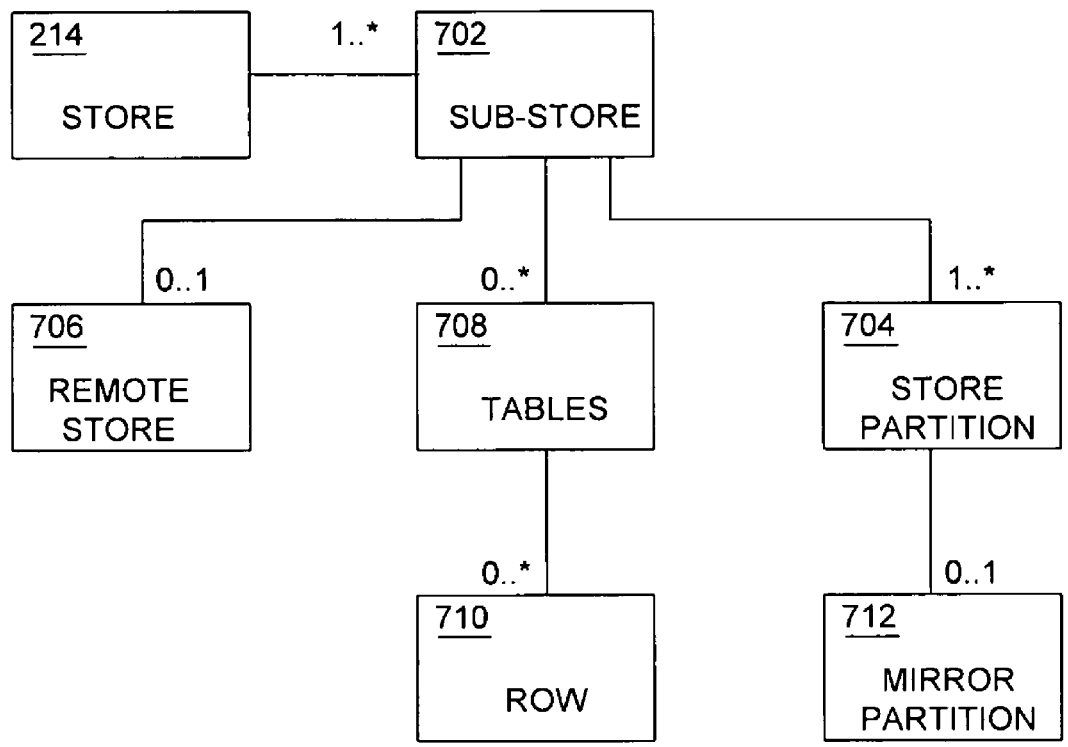
FIG. 7 is a block diagram of a store and its components.

FIG. 7 is a block diagram that depicts a high-level overview of the store and its components. The lines represent associations and the numbers at the ends of the lines represent cardinality. In the illustrative example, store 214 contains one or more sub-stores 702. Sub-store 702 has one or more store partitions 704. A sub-store may act as a cache to a remote relational store 706. Each sub-store can be configured independently. For example, a first sub-store may be configured as a single virtual memory cache to a backing database and another may be configured as a replicated store with no backing database. Illustrative configurations are described in more detail below.

Each sub-cache includes a set of one or more tables 708. If the sub-store is acting as a cache, each table is mapped to a specific table in the remote store. Each table has zero or more rows 710. If the sub-store is acting as a cache, then each row is mapped to a specific row in the remote store.

A sub-store is divided into one or more store partitions 704. In a simple configuration there may be one partition, but in a distributed configuration there may be multiple partitions to achieve better scalability and availability. Each partition may replicate its data to a mirror partition 712. This provides enhanced durability (when there is no backing remote store) and availability.

The store may be configured with a variety of configurations. For example: data can be cached for a remote database or stored in-memory; data may be replicated and/or partitioned; or the store may reside in the same virtual memory as an application, or in a separate virtual memory using a client/server model. There are a number of possible combinations of these features. Six illustrative configurations are described below. Each of these illustrative configurations can be applied independently to each sub-store. Data in a particular sub-store can be associated with a given sub-store based on the overall quality of service desired for that data, in terms of performance, availability, and durability. For example, a data may be set that is volatile and does not need to be stored in a database, but which is desired to be highly available. In that case, the data may be located in a replicated store.

Illustrative Configuration 1: Cache in a Single Virtual Memory

Figure 8:
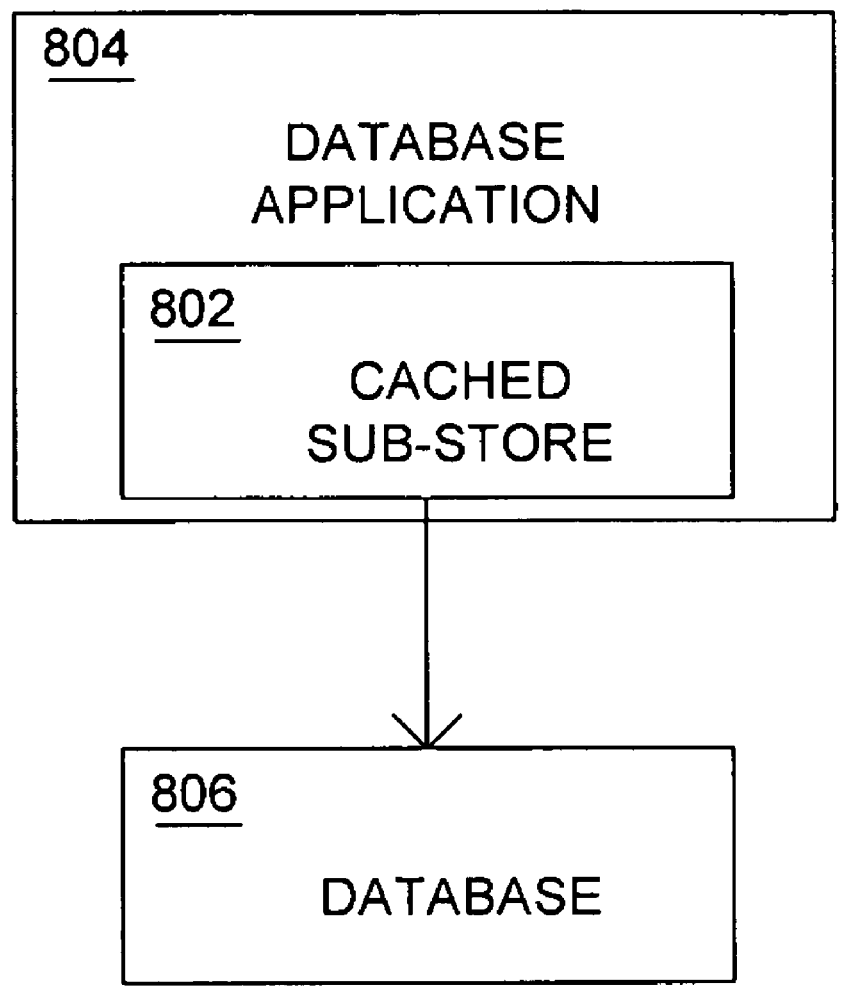
FIG. 8 is a block diagram of a first illustrative configuration consistent with the present invention.

Referring to FIG. 8 as an example, in this configuration, the sub-store 802 runs in the same virtual memory as the database application 804 and acts as a cache to a backend relational database 806. This provides the database application with beneficially fast read performance. Smart synchronization strategies, which are described below, can provide improvements in write performance.

Illustrative Configuration 2: Replicated In-Memory Database

Figure 9:
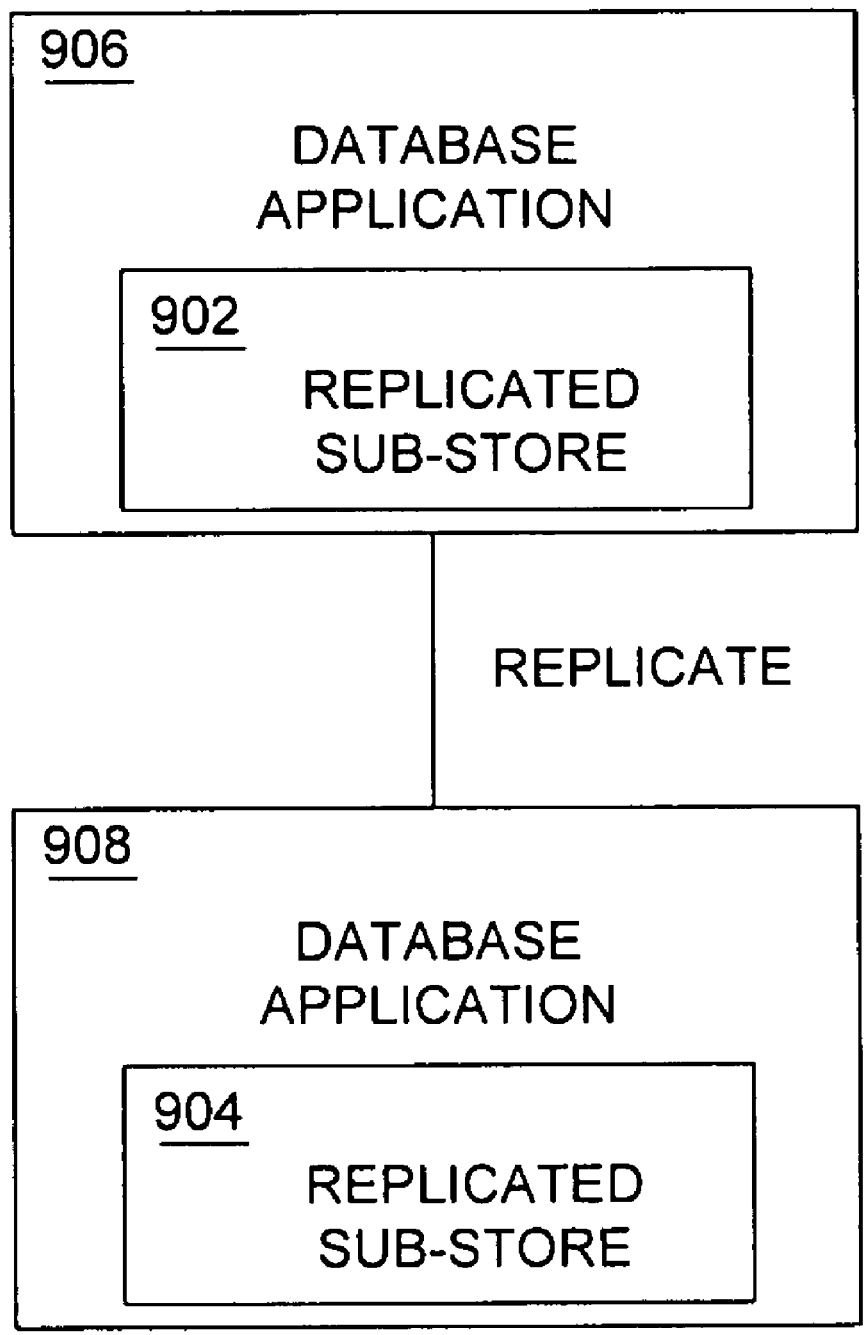
FIG. 9 is a block diagram of a second illustrative configuration consistent with the present invention.

This illustrative configuration is depicted in FIG. 9 and is preferably implemented in a fault tolerant environment with redundant hardware and power supplies. Under such conditions, methods, systems, and articles of manufacture consistent with the present invention can provide at least as good mean-time-between-failure for two in-memory copies of data as with a single disk drive. Accordingly, when the data is stored exclusively in memory, significant improvements in write performance are achieved compared to when data is stored on disk. Replicated sub-stores 902 and 904 act as in-memory databases. Each sub-store exists in the same virtual memory as a respective database application 906 and 908.

Illustrative Configuration 3: Database Cache Plus In-Memory Database

Figure 10:
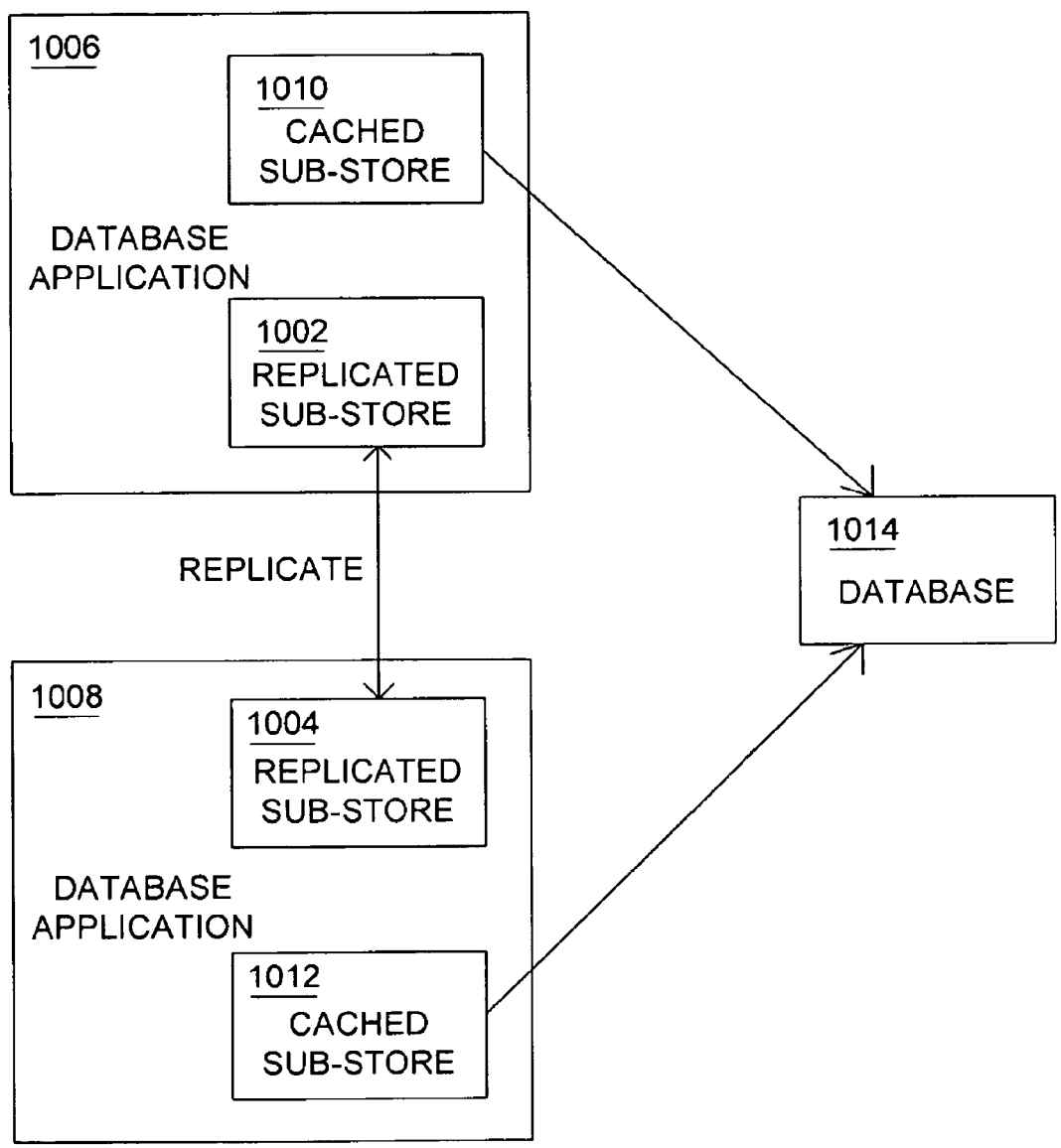
FIG. 10 is a block diagram of a third illustrative configuration consistent with the present invention.

In this configuration, some data may be mapped to a back-end database, while other data may be stored in an in-memory database. In the illustrative example of FIG. 10, the in-memory database is replicated. Accordingly, the example of FIG. 10 is a combination of the first and second illustrative configurations. Replicated sub-stores 1002 and 1004 act as in-memory databases. Each sub-store exists in the same virtual memory as a respective database application 1006 and 1008. Cache stores 1010 and 1012, which are located in the same virtual memory as their respective database application 1006 and 1008, act as a cache to a backend relational database 1014.

Illustrative Configuration 4: Client/Server In-Memory Database

Figure 11:
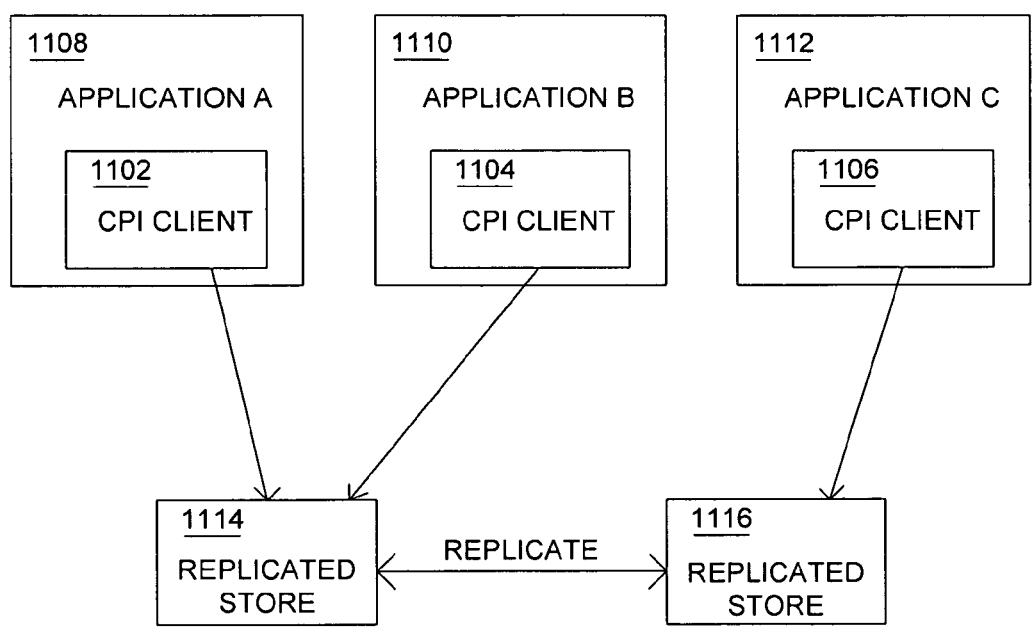
FIG. 11 is a block diagram of a fourth illustrative configuration consistent with the present invention.

When the sub-store is used as an in-memory database, it may be desirable to run the sub-store outside of the database application processes, so that one database application does not have to play the role of "server" to all the other database applications. As shown in FIG. 11, in this case, a client version of the CPI 1102-1106 is resident in each respective database application 1108-1112, while the data exists in the replicated sub-stores 1114 and 1116. The CPI client may use a load balancing technique to balance connections across the cache replicas.

In an embodiment, the remote sub-store may appear like a remote database store, such that the client-side code is essentially a local cache to the remote sub-store. In an alternative embodiment, data on the client may instead be cached for the length of the transaction.

Illustrative Configuration 5: Partitioned Cache

When the data in the sub-store is distributed across multiple processes, horizontal scalability can be achieved. In an illustrative example, each row belongs to a single partition, which is determined by a partitioning function on the row id. The sub-store can quickly determine where a row exists using this partitioning function. The partitioning function may be a suitable partitioning function, such as hashing on a primary key. In another illustrative example, partitions may overlap, for example, through a combination of partitioning and replication. The partitioning function then defines where the primary copy of each row is stored, while replicas of the row are stored in other partitions.

Figure 12:
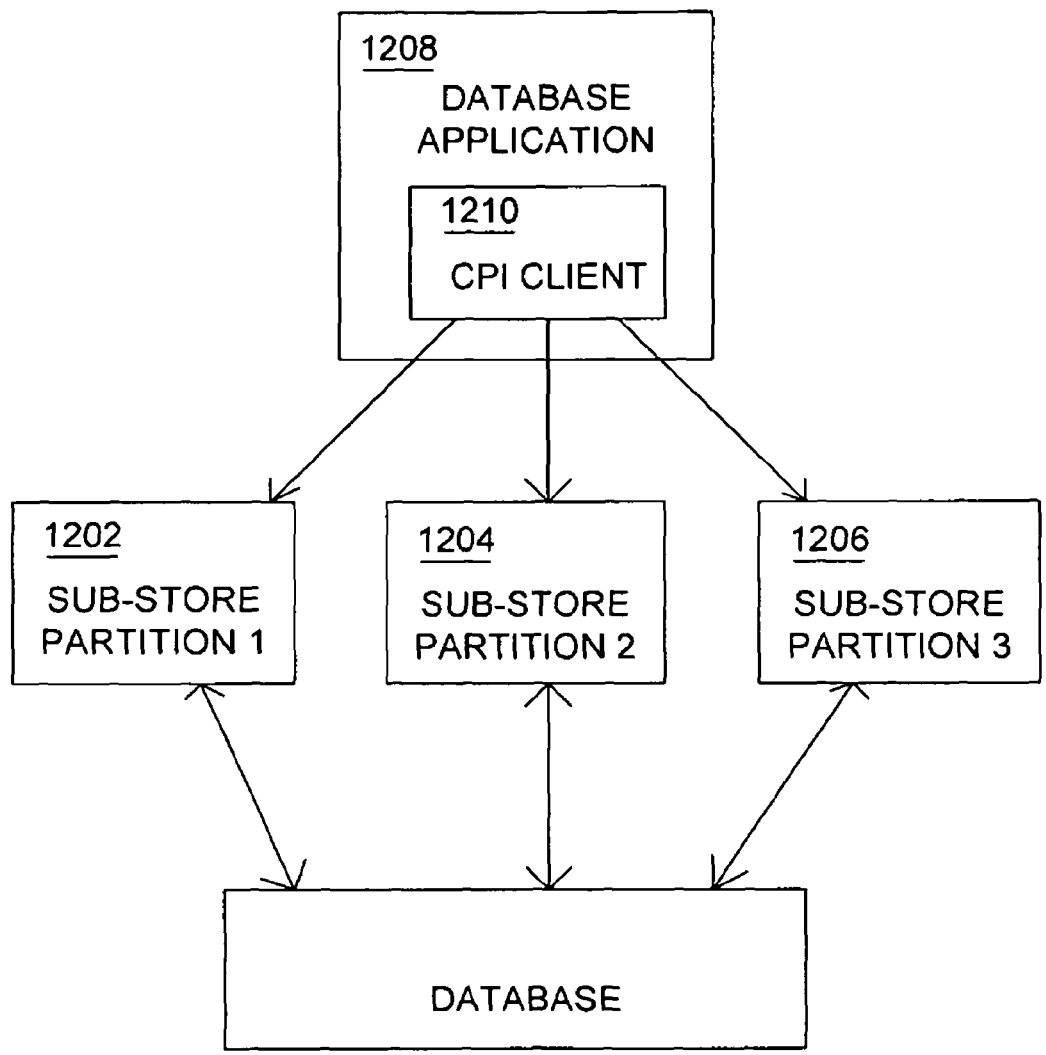
FIG. 12 is a block diagram of a fifth illustrative configuration consistent with the present invention.

As shown in FIG. 12, in this configuration, the sub-stores 1202-1206 preferably run outside the virtual memory of the database application processes 1208, in client/server mode. A CPI client 1210 resides in the same virtual memory as the database application process. In the illustrative example, the sub-stores transact with a single database. Transactions against a partitioned cache may involve multiple partitions. If a partitioned sub-store acts as a cache, then a transaction may span multiple database connections, perhaps across multiple machines. This results in a distributed transaction.

Illustrative Configuration 6: Replicated Cache

This configuration provides high availability and durability for a cache where the update strategy involves deferred writes to the backing database. Reads are as fast as in a non-replicated cache, while writes are replicated to another cache. In case of failure to the primary cache, deferred writes are performed by the replica.

Figure 13:
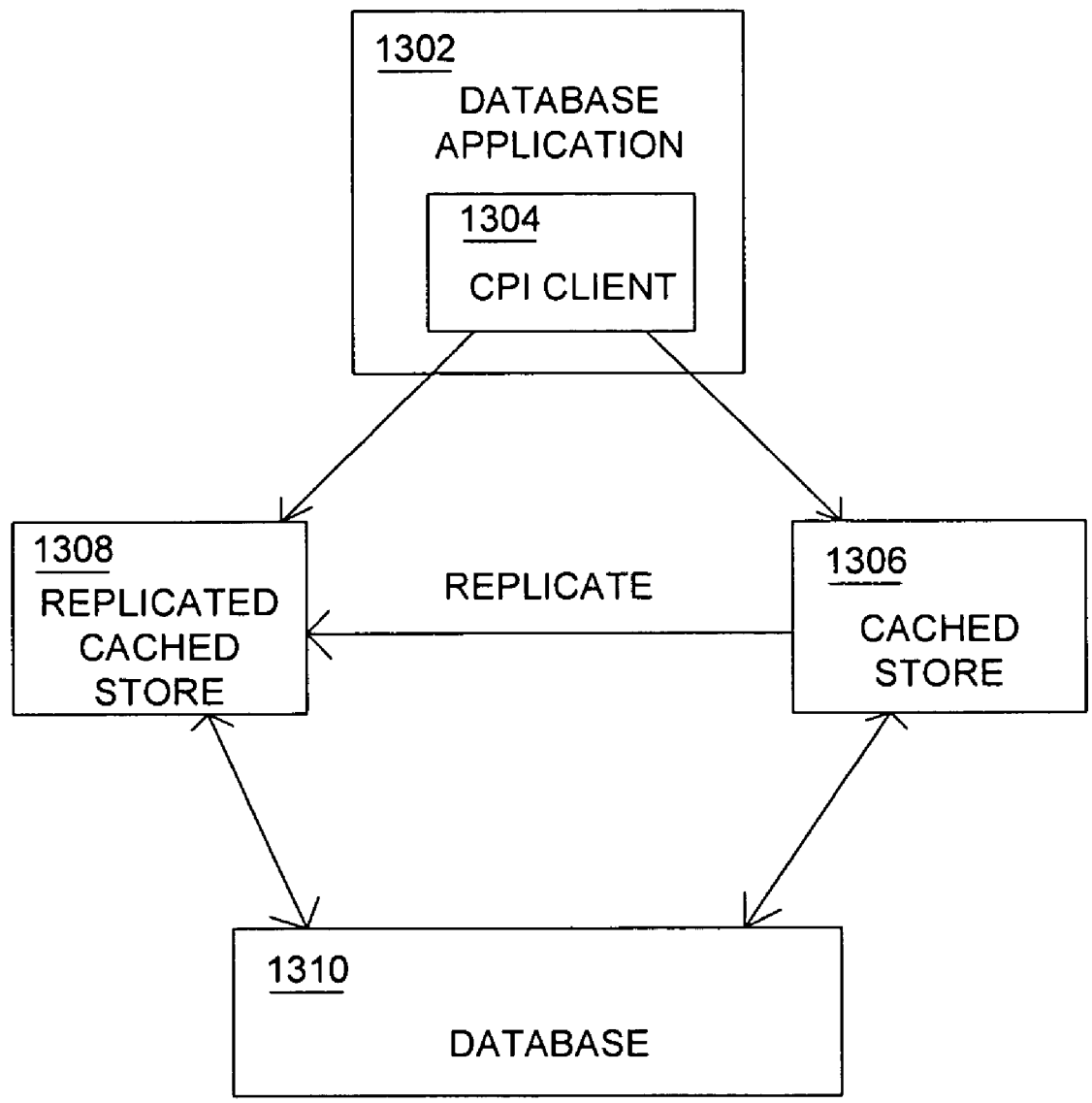
FIG. 13 is a block diagram of a sixth illustrative configuration consistent with the present invention.

This illustrative configuration is depicted in FIG. 13. Database application 1302 uses replicated caches 1306 and 1308 via CPI client 1304. The replicated caches transact with database 1310.

Illustrative Configuration 7: Database Cache with Multiple Backend Databases

Figure 14:
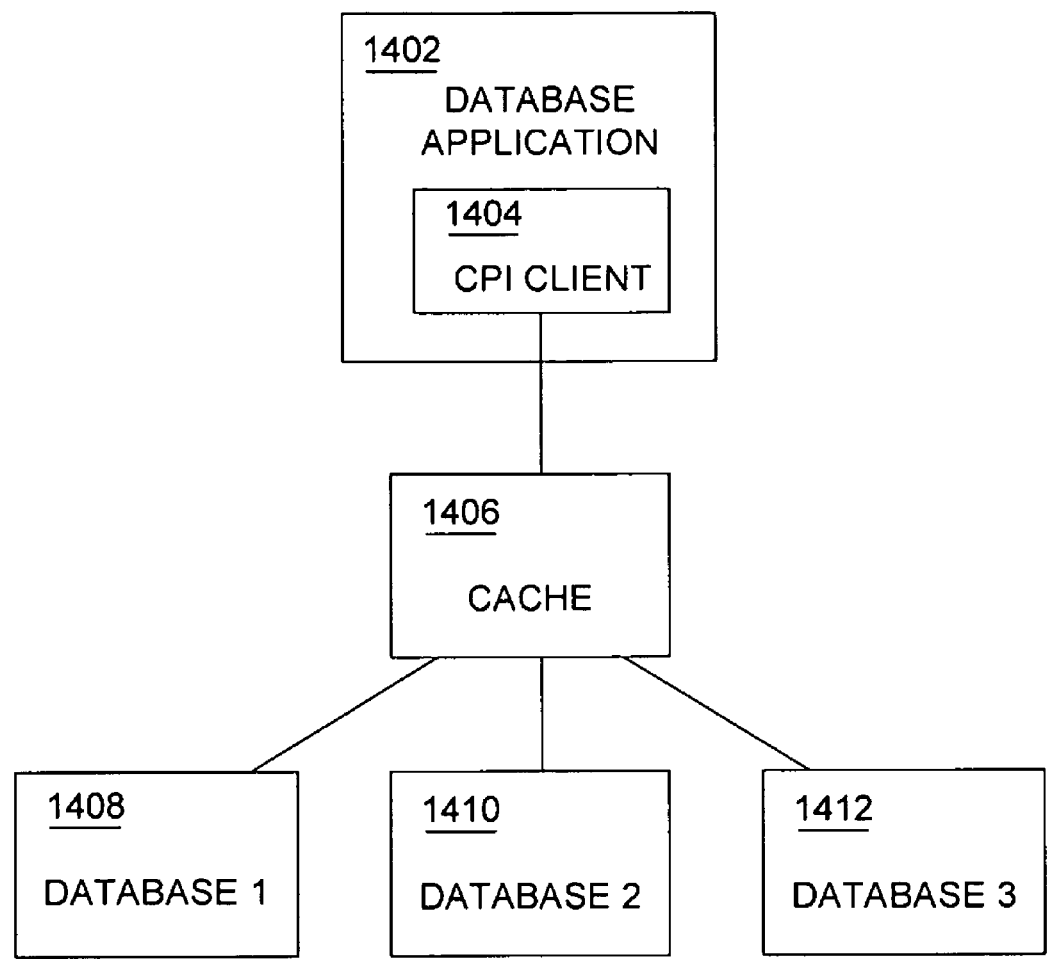
FIG. 14 is a block diagram of a seventh illustrative configuration consistent with the present invention.

As shown in FIG. 14, when the data store 1406 acts as a cache for backend databases 1408, 1410, 1412, the backend databases may comprise one or more remote databases, at least one of which may be an in-memory database. To the user of the cache, the several databases appear as one database. In the illustrative example, database application 1402 uses cache 1406 via CPI client 1404. Although FIG. 14 shows a single cache, the cache may be distributed. That is, the cache may be a partitioned or replicated cache.

This configuration provides high performance and scalability. Databases can be split into multiple databases for growth, integration, or workload reasons, for example. The cache provides for access to data from applications without changing the applications to account for the multiplicity of databases.

Illustrative Configuration 8: Partitioned In-Memory Database

Figure 15:
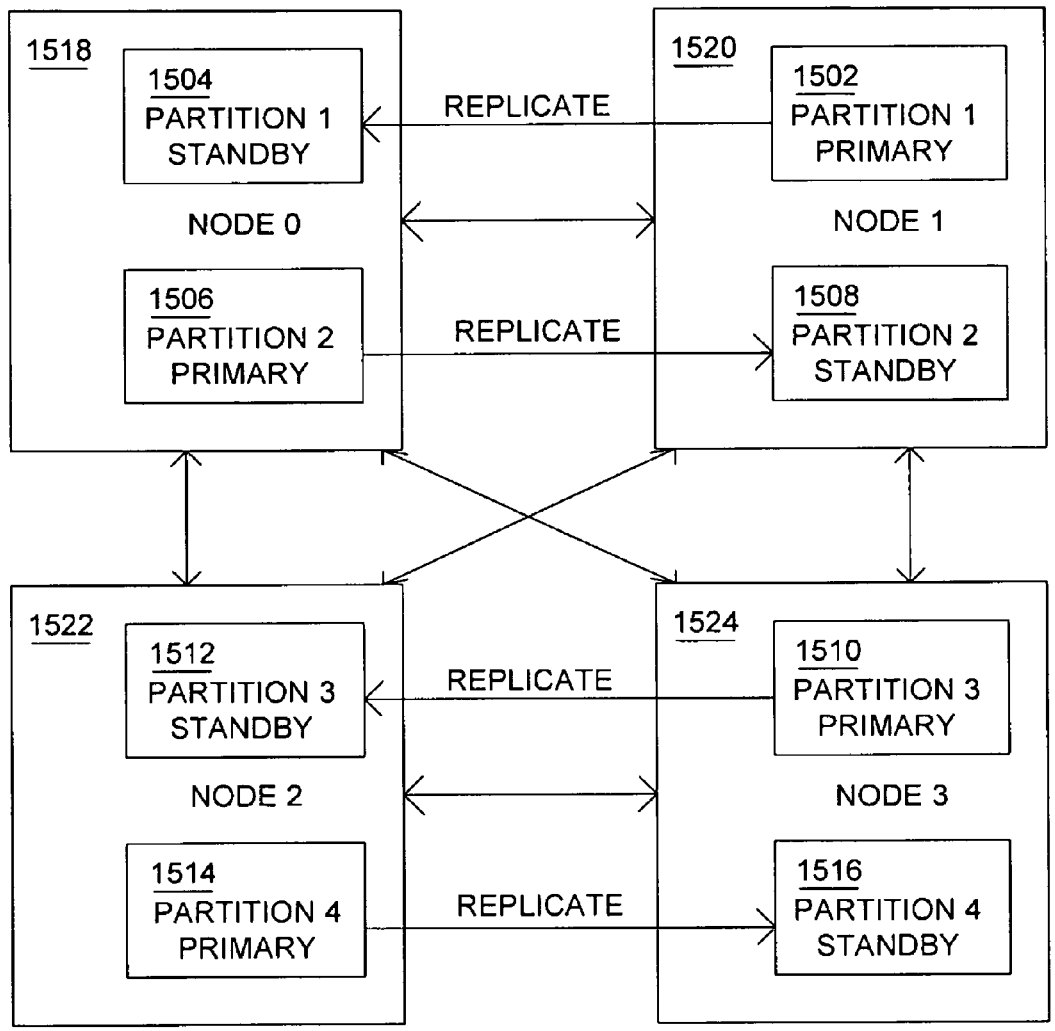
FIG. 15 is a block diagram of an eighth illustrative configuration consistent with the present invention.

Partitioning provides horizontal scalability. Since the partitioned database is memory resident, it does not have to use disk-based structures and algorithms. FIG. 15 shows a distributed, replicated configuration with the caches 1502-1516 in-process with the database applications 1518-1524 and no backend relational database. This configuration provides high read and write performance, scalability, and high availability. Illustrative Configuration 8 provides the benefits of scalability and availability, with the high performance of an in-memory database.

A partitioned sub-store requires a partitioning scheme that is used to determine which partition a record belongs to. In the illustrative example, the partitioning scheme is the high availability database ("HADB") hash partition scheme. The HADB partitioning scheme is described, for example, in Svein Olaf Hvasshovd, et al., *The Clustra telecom database: high availability, high throughput, and real-time response*, Proceedings of the 21$^{st}$ International Conference on Very Large Databases, Zurich, Switzerland, pp. 469-477, September 1995, which is incorporated herein by reference. Alternatively, different partitioning schemes may be used. The partitioned sub-store requires a distributed query mechanism. In the illustrative example, the query algorithms and techniques used in the above-described HADB partitioning scheme are used.

Each of the above-described illustrative configurations is described in more detail below. Initially, a description of synchronization strategies, isolation levels, and components of the store is described below. When a remote backing database is used, the user may configure different synchronization strategies between a sub-store and the remote backing database. This allows the user to control disparity between the sub-store and the remote backing database. For example, a synchronization strategy may effect a push to the backing database whenever there is a write. In another example, a trigger in the database may update the cache, so that the cache is updated at all times. These illustrative examples may be used in combination with other synchronization strategies.

For configurations that use a remote backing database, users may configure different synchronization strategies between a sub-store and the remote backing store. The backing store could be a backend database or a remote sub-store (for example, in client/server mode where the client is a cache to an in-memory database). These strategies may be applied on a per-request basis, where a request is a specific operation performed by the CPI adaptor on a sub-store within the context of a transaction. The synchronization strategy can be set for a transaction, a particular request, or on a specific table or set of tables.

Further, a store may use different synchronization strategies for different data. For example, a cache or a part of a cache may use the optimistic synchronization strategy for some data, pessimistic for other data, and lazy for other data. The data strategies may be distinguished by criteria, such as by data type or by run-time optimization by access patterns. Further, the synchronization strategies may be selected according to an algorithm. For example, the synchronization strategy may be selected based on field data. In another example, selection may be based on a predicate consisting of an expression containing values of fields. For example, for stored data that describes employees' state of residence, an optimistic synchronization strategy may be used for residents of California and a pessimistic synchronization strategy may be used for residents of other states.

The synchronization strategy may be chosen manually or the system may automatically choose the synchronization strategy. The strategy may be chosen manually or statically, for example, by a system administrator or on a per-table or per-request basis. For example, the system administrator may specify a strategy for particular fields, rows, tables, or parts of tables.

The system may automatically choose the synchronization strategy, for example, by analyzing usage statistics. For example, the system may analyze access patterns to identify one of the following illustrative situations: which tables, columns, or rows are heavily updated by transactions; which ones are updated through particular systems; or which ones are infrequently updated. Based on the access patterns, the system may implement particular strategies. For example, if data is rarely updated, the system may use a lazy, optimistic strategy. If updates are typically through a particular system, the system may assume that that system's cache includes the truth and overwrite the backing store from it. In another example, if data is heavily updated from many machines, the system may use either a pessimistic locking on that data, or use an incremental merge strategy when the updates are typically increments to numeric values.

Illustrative synchronization strategies are described below in order of least conservative to most conservative. The write strategies are strategies that may be applied at the time of transaction commit. The read strategies are strategies that may be applied whenever data is accessed from the backing store.

Illustrative write strategies are described below. Although the synchronization strategy is applied independently for each request, write strategies are evaluated at commit time. For requests, a row that is modified by a given request is "tagged" with the write strategy for the request.

Lazy: In this strategy, data is written to the backing store in a "lazy" mode—that is, outside the scope of the transaction in which the request was made. This can be used, for example, where someone wants a single-machine version of a store, where the backing database provides some level of durability and database application access is through the store. In other examples, data may be written in accordance with conflict resolution rules.

Overwrite: Data tagged with this strategy overwrites data in the remote store. When the overwrite strategy is used, it is preferable that the sub-store is the only item modifying the data for the affected rows.

Optimistic: Prior to committing the transaction, the store checks to see if the rows tagged with this strategy have been updated in the remote store since they were read into the cache. If they have been updated, the store rolls back the transaction. This provides enhanced concurrency if there are multiple applications accessing the same data.

Write-Locked: The first time a row is modified, a write lock may be obtained in the remote store.

Checked: Prior to committing the transaction, the store checks to make sure that rows in the cache touched in the transaction, even rows that were read and not modified, are consistent with the database, and rolls back the transaction if they are not. For example, this strategy is useful when the user makes changes to rows based on the values in other rows, even though these rows have not changed.

Further, updates may be applied to the cache and synchronization of the database may be deferred. For example, some or all of the cache may be updated, while database synchronization is deferred until a later time. When the database is synchronized, the synchronization may be performed using resolution rules. Illustrative resolution rules are described in more detail below.

In another example of deferred synchronization, the store may assume for at least some data that the truth is in the cache, and overwrite the data in the database later. Accordingly, the cache returns to the user quickly after writing the cache. Alternatively, the store may assume that the truth is in the database, and perform fast reads on the cache. In this case, the store may accept data that is possibly out of date.

Further, when the database is updated, but not via the cache, this may trigger a synchronous or asynchronous write-back to the cache to keep the cache up to date.

Illustrative read strategies are described below.

Optimistic: When reading an object, the store assumes the data in the cache is correct and does not check with the database to see if more up-to-date data is available.

Pessimistic: When reading a row, the store throws away the cache row and reads it from the remote store, but does not lock the row in the remote store.

Read-Locked: This strategy is similar to the pessimistic read strategy, but also a read lock is acquired on the row in the remote store. Accordingly, no synchronization check is required at commit time.

Exclusive-Locked: The store acquires an exclusive lock on the row (vs. a read lock) when a row is accessed.

Each request has a specific synchronization strategy. The user can set the synchronization strategy for a transaction, a particular request, or for a given table or set of tables. The synchronization strategy to be used for a given request may be determined by the following illustrative rules:

If a strategy is specified for a specific request, this overrides the strategy specified for the transaction.

If a strategy is specified for a specific table, this overrides the strategy specified for request or the transaction. There is an exception to this rule. Because the Checked write strategy applies to rows affected by the transaction, then as soon as the Checked write strategy is encountered anywhere within the transaction, the entire transaction strategy runs at the Checked write strategy.

When the remote store is a Structured Query Language ("SQL") database, database locks may be accomplished through the standard American National Standards Institute ("ANSI") isolation levels. A description of ANSI isolation levels may be found, for example, in ANSI X3.135-1992, "Database Language SQL," which is incorporated herein by reference. In the illustrative embodiment, the synchronization strategies are implemented using isolation levels. For a given cache transaction, a single connection is established with the database, with a specific isolation level, for operations that involve obtaining database locks. This situation is referred to as a "transaction connection" below. Some requests within the cache transaction may have a read strategy that does not require a database lock, and so they may use an independent connection running outside the scope of the current cache transaction. Illustrative scenarios are described below for how the illustrative synchronization strategies are implemented using isolation levels.

Lazy Write: In one illustrative example, in a background thread, the store obtains a connection to the database and sets the isolation level to READ_COMMITTED. The store submits modified rows, checking to see if the data has been modified in the database since it was read from the cache by the application.

In another example of a lazy write, data is written when updates go through a particular cache, for example with read-mostly access from other caches. This allows transactions to proceed at cache speed as the backing database is updated in the background. In yet another example, data is written when all updates to a particular table or group of tables or groups of columns all go through a particular machine's cache, so that there is one writer for each group of data. This also allows transactions to proceed at cache speed. In a further example, data is written when it is not important that queries be based on the latest version of the data being streamed to the back end. For example, if 1% of the data is being changed each day, and the queries are decision support queries that can be based on approximate data. This example allows updates on the back end to be done in large batches and in the background when there is lesser load.

If there are conflicts, the store may use conflict resolution mechanisms to resolve conflicts automatically, or to allow the user to resolve them manually. For example, a database administrator could specify on a per-table or per-column basis which resolution rules should be applied. Resolution rules may be applied when it is discovered, in synchronization of a cache with a back-end database (which could also be a cache), that the same record has been modified both places. Illustrative conflict resolution rules are identified below:

Field merge: Allow updates to a record from two different transactions as long as they did not change the same fields. Updates from both transactions are applied to the different fields of the record.

Field group merge: Allow updates to a record from different transactions as long as they did not change fields in the same field group. The field group may be defined, for example, by an administrator, an API, or metadata. For example, an update to the zip code in one transaction may conflict with an update to the city in another transaction, if the city and zip code were defined to be in the same field group.

Priority overwrite: Establish a priority (cache overrides database, or vice versa) establishing which update to a record takes precedence. The other update may be thrown away.

Application/user priority overwrite: Track which updates are made by which applications or users (e.g., with an additional field on records), and give precedence to updates with a higher specified priority.

Most-recent priority overwrite: Accept the changes that were made most recently, discarding the older record updates. This may be performed using a time stamp or some other mechanism that identifies when record updates were performed.

Undo/Redo merge: Specify a list of allowed transactions (e.g., Add Customer, Place Order, Delete Employee), and track which updates are made by which transactions. Keep enough information to "back out" of one of the transactions, and then re-apply it to the current database (using the field values from conflicting transactions) to get serialization.

Additive merge: For fields that are always incremented, e.g. Total Sales for a customer, or Order Count, compute the total increment since last synchronization in both the cache and the backing data store, and add the sum to the field value. For example, if the Order Count has increased from 1000 to 1055 in the database, and 1000 to 1015 in the cache, set the Order Count to 1070.

Application escalation: When a record has been updated in both the cache and the backing database, call a procedure supplied by the database administrator to resolve the conflict. This procedure would be implemented using application-specific knowledge about how to combine the updates.

User-administrator escalation: Conflicting record updates are resolved by a human operator, who is provided with information regarding the conflict and asked which updates to keep.

Overwrite Write synchronization strategy: When the transaction is committed in the cache, the store uses the transaction connection if it exists or obtains a new connection with the isolation level to READ_COMMITTED. The store submits changes to rows tagged with this strategy without checking to see if the data has been modified since it was read into the cache.

Optimistic Write: When the transaction is committed in the cache, the store submits the changes using the transaction connection if it exists or obtain a new connection with an isolation level of READ_COMMITTED. The store ensures that the rows tagged with this strategy have not been modified since they were read into the cache. The operation may be aborted if there is a conflict, such as when a tagged row has been modified. Alternatively, resolution rules, such as those described above for Lazy Write, may be applied to resolve the conflict.

Checked Write: When the transaction is committed in the cache, the store submits the changes using the transaction connection if it exists or obtain a new connection with an isolation level of READ_COMMITTED. The store validates that rows touched by the transaction have not been modified in the remote store. The operation is aborted if there is a conflict, such as when a tagged row has been modified.

Optimistic Read: If the data is in the cache, the store reads it from the cache. If it is not in the cache, the store obtains an independent connection with READ_COMMITTED isolation level, reads the data, and releases the connection.

Pessimistic Read: The store obtains an independent connection with READ_COMMITTED isolation level, reads the data, and releases the connection.

Read-Locked Read: The store uses the transaction connection if it exists, or obtains a new one with READ_COMMITTED isolation level. The store reads the data with this connection but do not release the connection, it is now the transaction connection.

Exclusive-Locked Read: If the transaction connection exists, the store checks to see if the isolation level is SERIALIZABLE. If it is not, then this request can not be correctly serviced within the context of this transaction; so the store issues an exception. The CPI adaptor can then choose to either not perform this request or roll back the transaction.

If the transaction connection does not exist, the store obtains a new connection with the isolation level set to SERIALIZABLE, and reads the data. The store does not release the connection, it is now the transaction connection. Subsequent requests that use the transaction connection will operate at the SERIALIZABLE isolation level.

Figure 16:
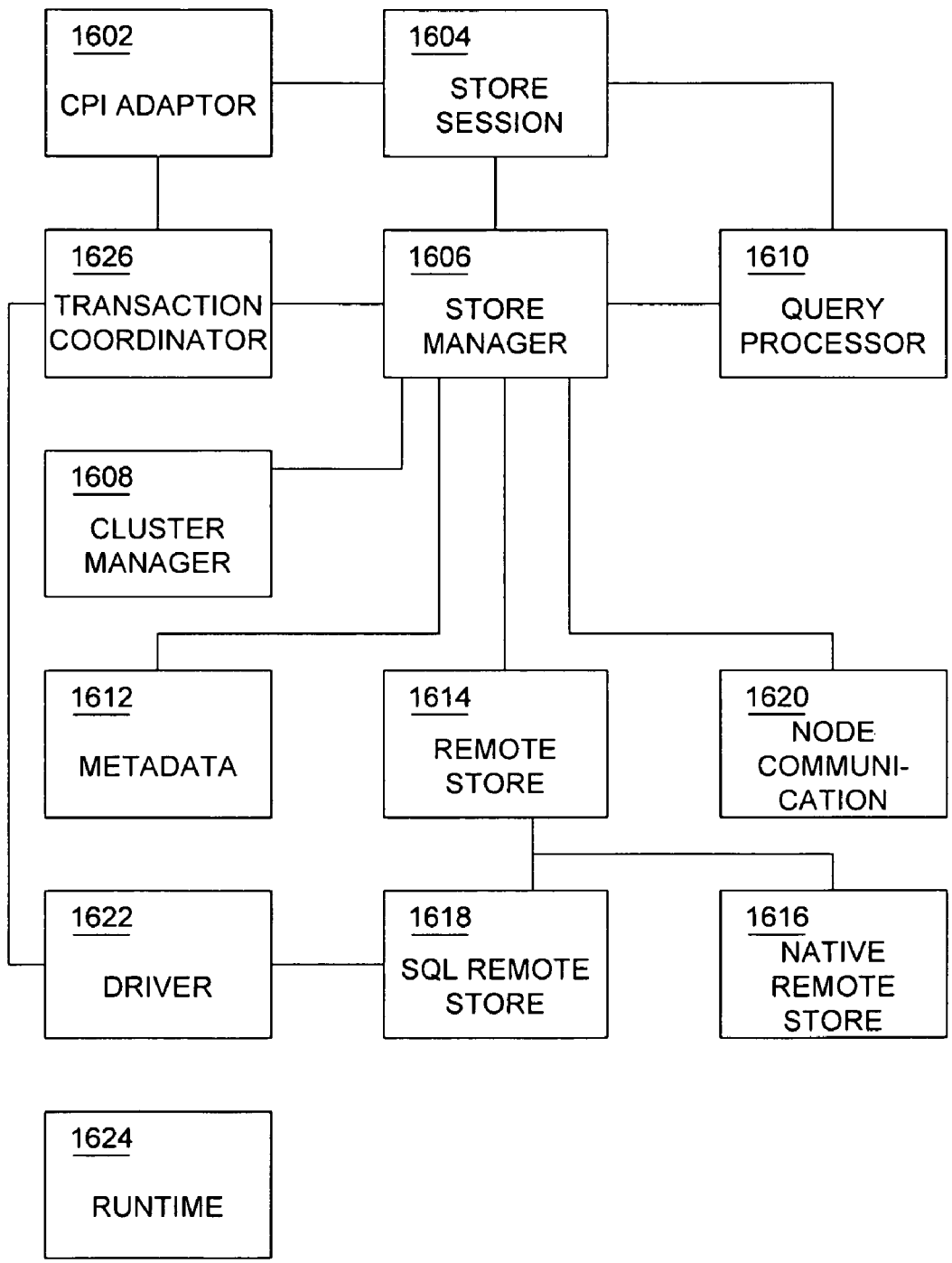
FIG. 16 is a block diagram of illustrative components of the store.

FIG. 16 shows an overview of illustrative components of the store. The dashed arrows represent dependencies. Descriptions of each component are presented below. One having skill in the art will appreciate that additional or alternative components may be implemented.

CPI adaptor 1602 is not a component of the store, but is an external user of the store. As described above, CPI adaptors may be provided to implement/plug in to particular persistence APIs, such as JDO, CMP, JDBC, and JAXB. A session store 1604 provides an entry point for the CPI adaptor into a store. It contains context for the current conversation with the store. In particular it keeps track of transactional context. A store manager 1606 is responsible for managing a particular store. It stores the rows and is responsible for maintaining transactional consistency within the store. It is also responsible for coordinating data with remote repositories, be they other stores or a database. When a store needs to participate in global transactions, the store manager can act as an XA resource adapter—it will provide an implementation of the XAResource interface. In a replicated or partitioned environment there will be multiple store managers. There is one store manager for each virtual memory participating in the distributed store. These individual virtual memories running in a distributed store are called nodes herein. A cluster manager 1608 is an external program or module that is responsible for coordinating the multiple nodes in a distributed store. In the preferred embodiment, the cluster manager is the Sun Cluster product manufactured by Sun Microsystems, Inc. Alternatively, a different cluster manager may be used. The cluster manager detects the health of a node, initiates takeover, recovery and repair, and implements policies for network partitioning.

A query processor 1610 takes query trees provided by the CPI adaptor, generates a query plan, and executes the query. The query processor works with the store manager to obtain metadata and to acquire cache objects as may be needed. A metadata module 1612 stores the metadata for the store. The stored metadata includes, for example, the store schema, the mapping to the remote store, and partition information. Additional or alternative metadata can also be stored. A remote store 1614 is an abstraction that allows a consistent approach when the data for a given cache table is owned remotely rather than locally. The remote store can be to another store (native remote store 1616) or it can be to a backend database (SQL remote store 1618.) When a backend database is used, a driver 1622 allows communication to the backend database. In the illustrative embodiment, the driver is a JDBC driver, however, other drivers may be used.

The node communication module 1620 is responsible for communication between nodes. This module replicates data from a primary partition to a standby partition, routes a request from one node to another (e.g., when a given node receives an update row for a row belonging to a partition on another node), and administers other inter-node communications.

A runtime module 1624 provides an underlying framework for the various components of the store. The runtime module provides services such as network communication, threading, logging, debug/trace, internationalization, and security. These services may be implemented using, e.g., Java 2 Runtime, which is manufactured by Sun Microsystems, Inc.

A transaction coordinator 1626 regulates transactions between the various modules to ensure that transaction steps occur in the proper sequence.

Eight illustrative configuration were introduced above. A more detailed description of the illustrative configurations is presented below, including a description of the interactions between the various modules of the store. The interactions are described with reference to sequence diagrams. One having skill in the art will appreciate that the sequences are illustrative, and that alternative sequences may be implemented.

Illustrative Configuration 1: Cache in a Simple Virtual Memory

The following scenarios relate to a store running as a cache running in a single virtual memory (i.e., not partitioned or replicated), with a backing store (e.g., an SQL store.)

Figure 17:
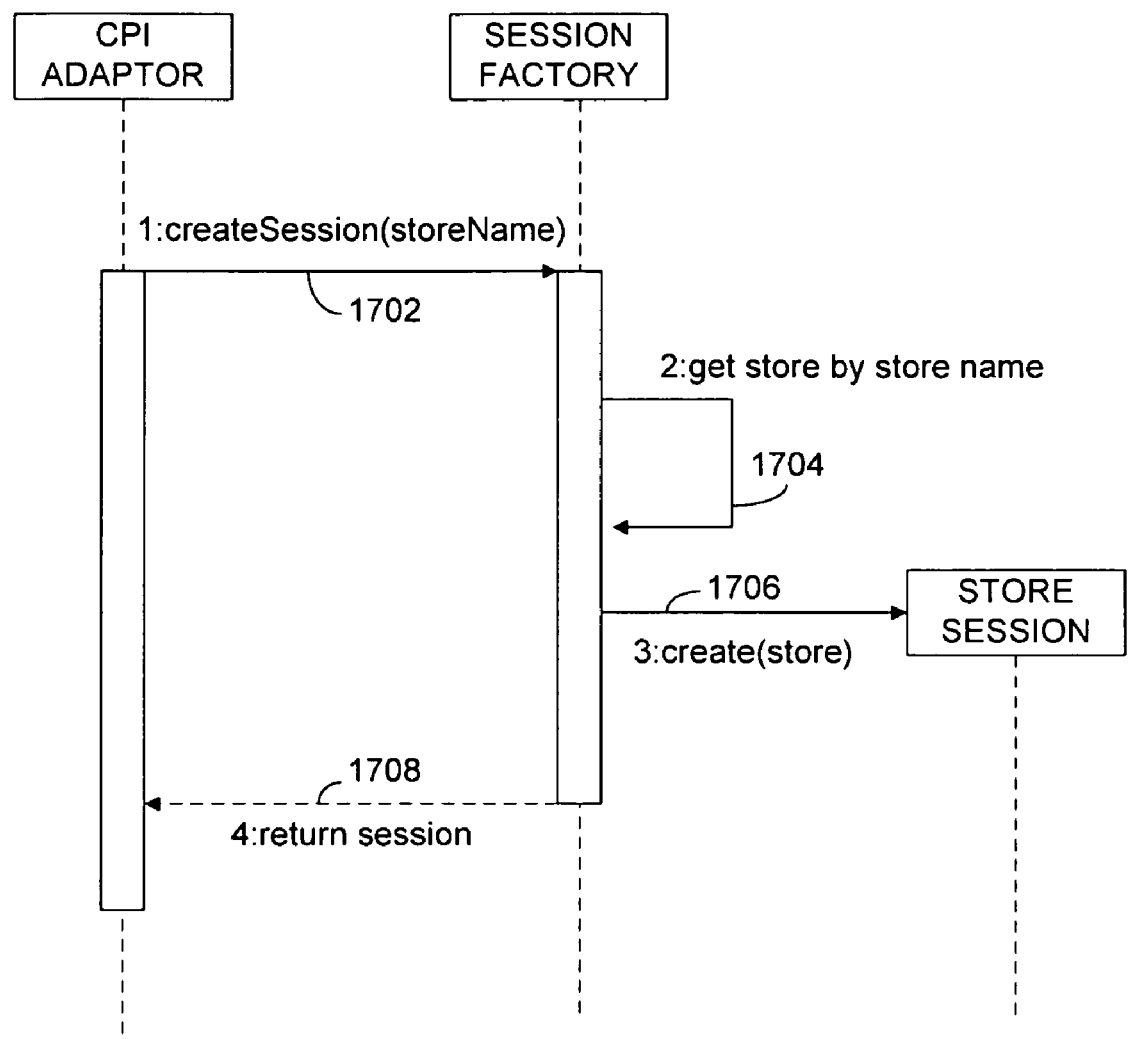
FIG. 17 is a sequence diagram showing illustrative steps for establishing a session in the first illustrative configuration.

FIG. 17 shows a sequence diagram for a scenario of establishing a session. To communicate with a particular sub-store, the CPI adaptor establishes a session with the sub-store. The CPI adaptor does so by asking the store to create a store session by specifying the sub-store name (step 1702). The session factory finds that sub-store based on the name provided by the CPI adaptor (step 1704). The session factory then requests the store session module to create a session to the sub-store (step 1706) and returns the session to the CPI adaptor (step 1708).

Figure 18:
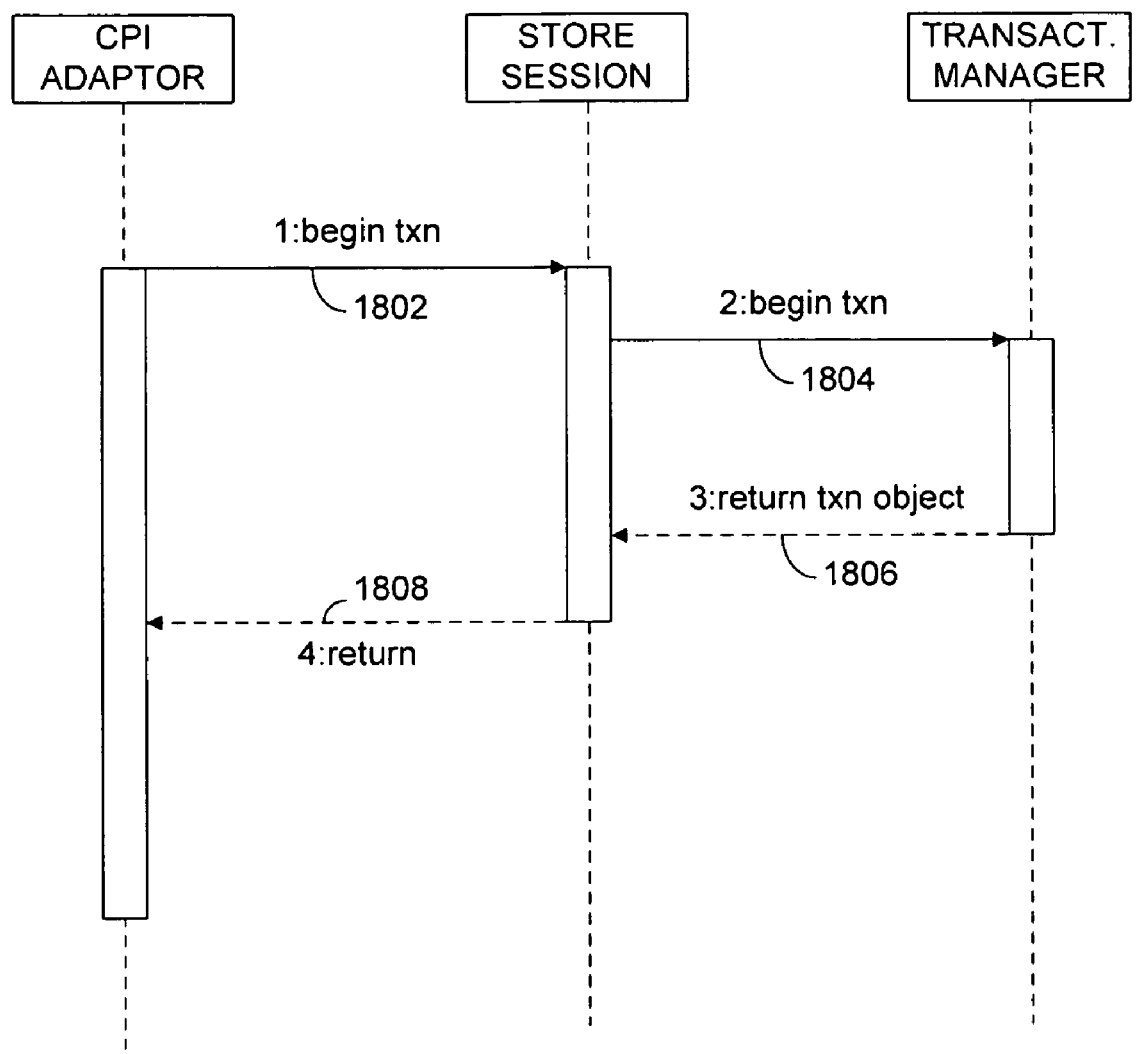
FIG. 18 is sequence diagram showing illustrative steps for beginning a session in the first illustrative configuration.

After a session has been established with the sub-store, the CPI adaptor can transact with the sub-store. In the preferred embodiment, the CPI adaptor explicitly indicates the beginning and end of transactions. Alternatively, transactions can be automatically committed. FIG. 18 depicts a sequence diagram for beginning a transaction. At this point, the store session is running within a specific transactional context. A transaction has not been started with the remote store. A transaction is started with the remote store as necessary depending upon the rows being read or modified and the synchronization strategy associated with those rows.

The CPI adaptor first requests the store session to begin the transaction (step 1802). The store session, in turn, requests the transaction coordinator for a transaction object (step 1804). The transaction object provides a handle to represent a transaction. Then, the transaction coordinator instantiates the transaction object and returns it to the store session (step 1806). After receiving the transaction object, the store session forwards the transaction object to the CPI adaptor (step 1808).

Figure 19:
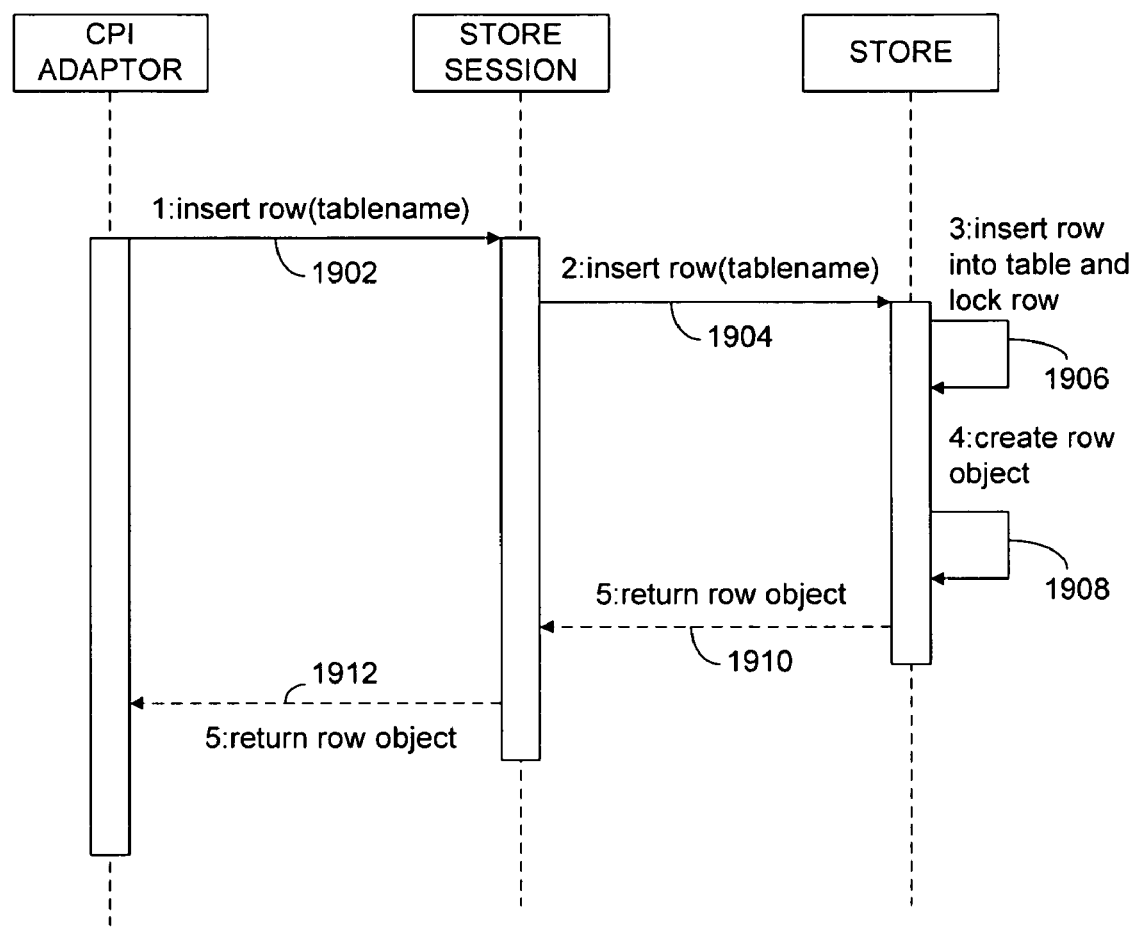
FIG. 19 is a sequence diagram showing illustrative steps for inserting a row in the first illustrative configuration.

The CPI adaptor can engage in various operations with the store, such as inserting rows, deleting rows, committing data, and other types of operations. FIG. 19 shows a sequence diagram for the case of inserting a row in the cache. First, the CPI adaptor requests to insert a row in a particular table by identifying the table name (step 1902). The store session receives the CPI adaptor's request and forwards the request to the store (step 1904). Then, the store inserts a row into the table and locks the row (step 1906). After inserting the row into the table, the store creates a row object (step 1908). The a row object is used to represent the row to the CPI adaptor. It also tracks changes to the row and acts as an "after image" of the row. In the illustrative example, the underlying row data is not changed until the transaction is committed. This allows the store to roll back a transaction in case there is some type of failure. It also allows the store to send the changes made to a standby replica.

The store sends the row object to the store session (step 1910), which forwards the row object to the CPI adaptor (step 1912). The row object that is returned to the CPI adaptor is empty and uninitialized, except for the row id. The CPI adaptor may fill in the values in the object as part of this transaction. The store session locks the underlying row so another transaction cannot see the row in its semi-initialized state.

Figure 20:
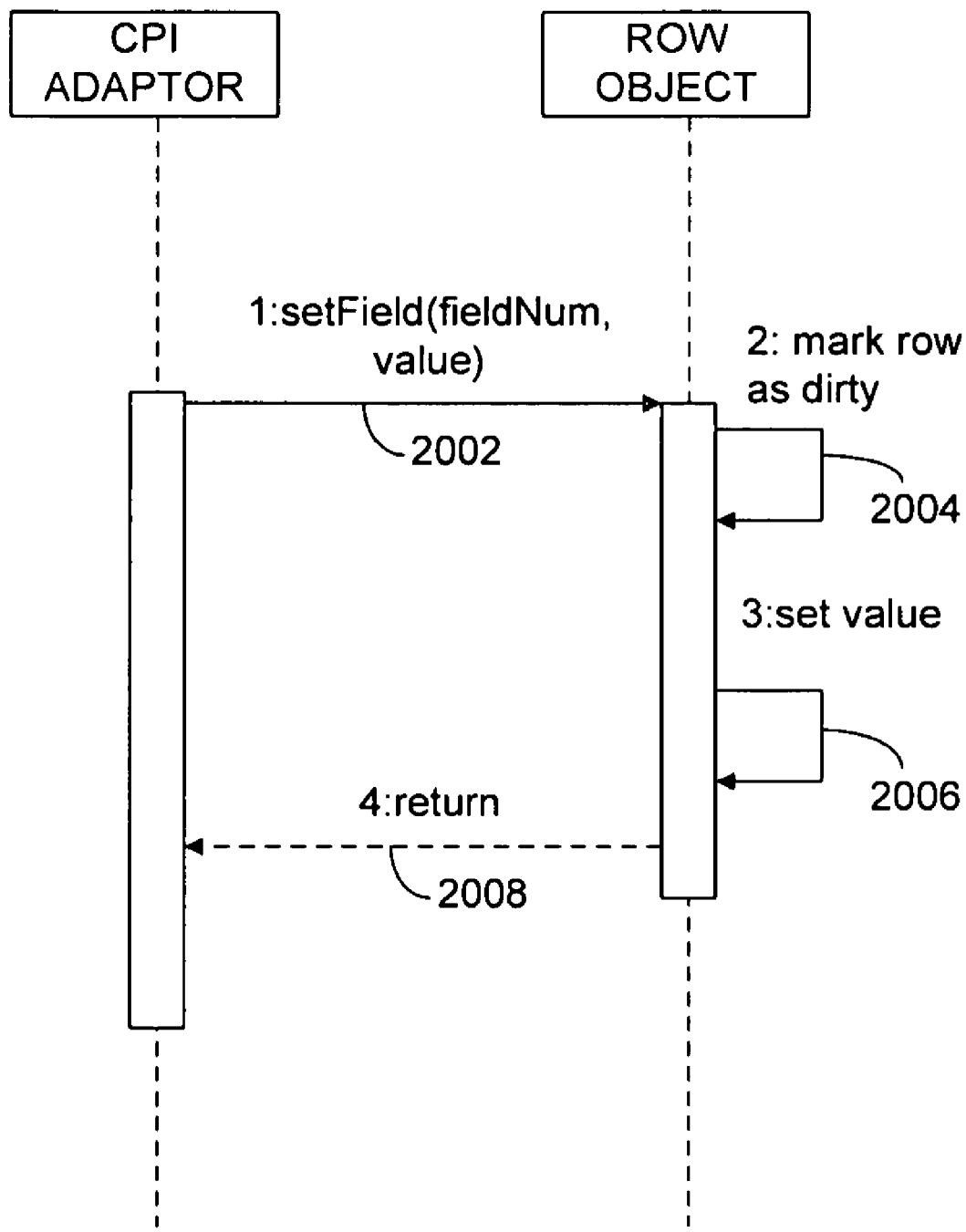
FIG. 20 is a sequence diagram showing illustrative steps for updating a row in the first illustrative configuration.

FIG. 20 shows a sequence diagram for an illustrative transaction for updating a field in a row in the cache. In the illustrative example, when a field is updated, the modification is made in the row object but is not applied to the underlying row until the transaction commits. First, the CPI adaptor sends a request to update a field to the row object (step 2002). The request identifies the field (e.g., by the field's number) and includes the value to be entered into the field. Then, the row object marks the row as dirty (step 2004) and sets the value in the field (step 2006). The row object then notifies the CPI adaptor that the row has been updated (step 2008).

Figure 21:
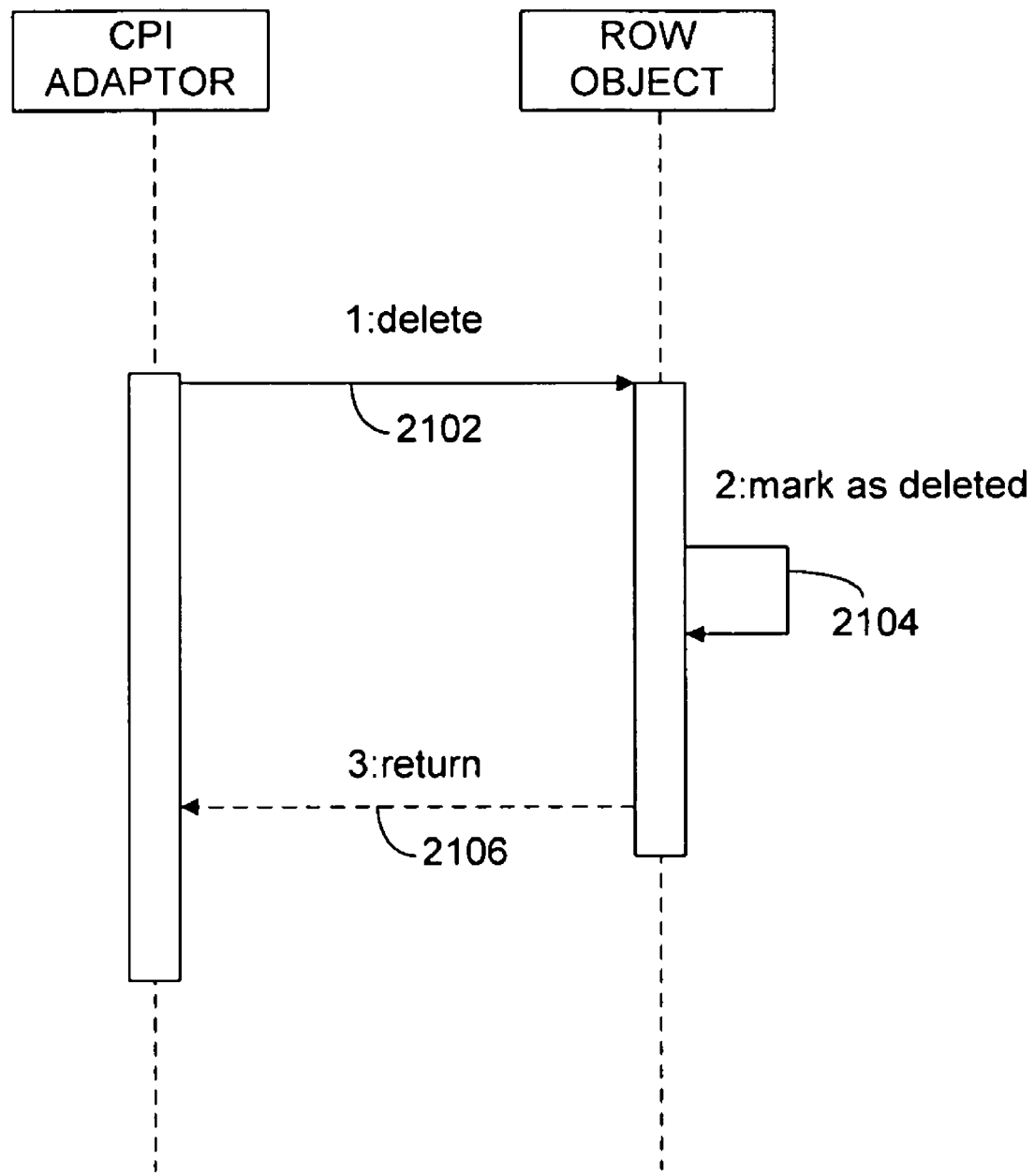
FIG. 21 is a sequence diagram showing illustrative steps for deleing a row in the first illustrative configuration.

FIG. 21 depicts a sequence diagram for a delete row transaction. In the illustrative example, the underlying row is not deleted—instead, the row object is marked as deleted. When the transaction is applied, the row is then deleted from the store. As shown in FIG. 21, the CPI adaptor sends a request to the row object to delete a row (step 2102). The row object then marks the row as deleted (step 2104). Then, the row object notifies the CPI adaptor that the row has been marked as deleted (step 2106).

The CPI adaptor can also query the store for data. For example, the CPI adaptor can request to obtain one or more rows from the store. In the illustrative example, the CPI adaptor submits a query to the store using a data structure called a query tree. This tree is built by an interpreter within the CPI adapter, such as an SQL interpreter, a JDO query processor, an JAXB query interpreter, or a CMP execution engine. Query trees and interpreters that build query trees are known in the art and will not be described in more detail herein. By using a query tree, the CPI adapter's queries can be language independent and do not require implementation of a query language.

The query tree is processed by the query processor. For a store configured as a cache, if the data is in the cache and the affected tables have a synchronization strategy that does not require checking the remote store for updated data, then the query processor performs the query against the data in the cache. However, if a synchronization strategy requires it, then changes may be flushed to the remote store and the query submitted to the remote store for execution. Alternatively, data may be fetched from the backing store into the cache, and a query may be executed on the cache if at least some of the data is in the remote store. Further, the query may be executed on a combination of the cache and the database. In this later example, the query may be split into two parts and the results may be merged. A further description of this example may be found for example in U.S. Pat. No. 6,243,710, which is incorporated herein by reference.

The query processor runs against data that is consistent with the current transaction. This means it works with both the data stored in row objects (e.g., rows that have been modified as part of a transaction) and the data in the underlying rows themselves (e.g., rows that have not been modified as part of a transaction).

Figure 22A:
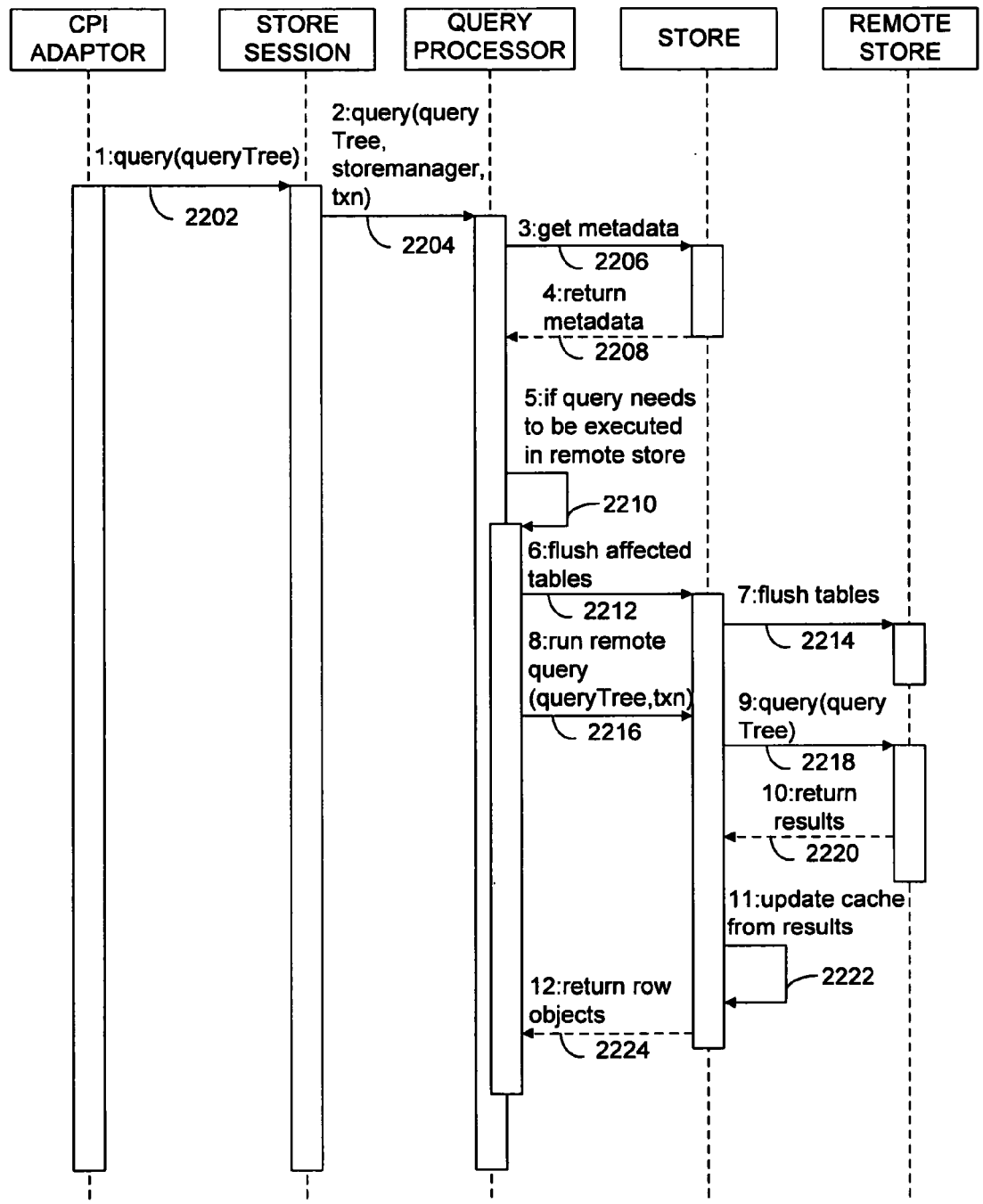
FIGS. 22A and 22B are sequence diagrams showing illustrative steps for querying the store in the first illustrative configuration.
Figure 22B:
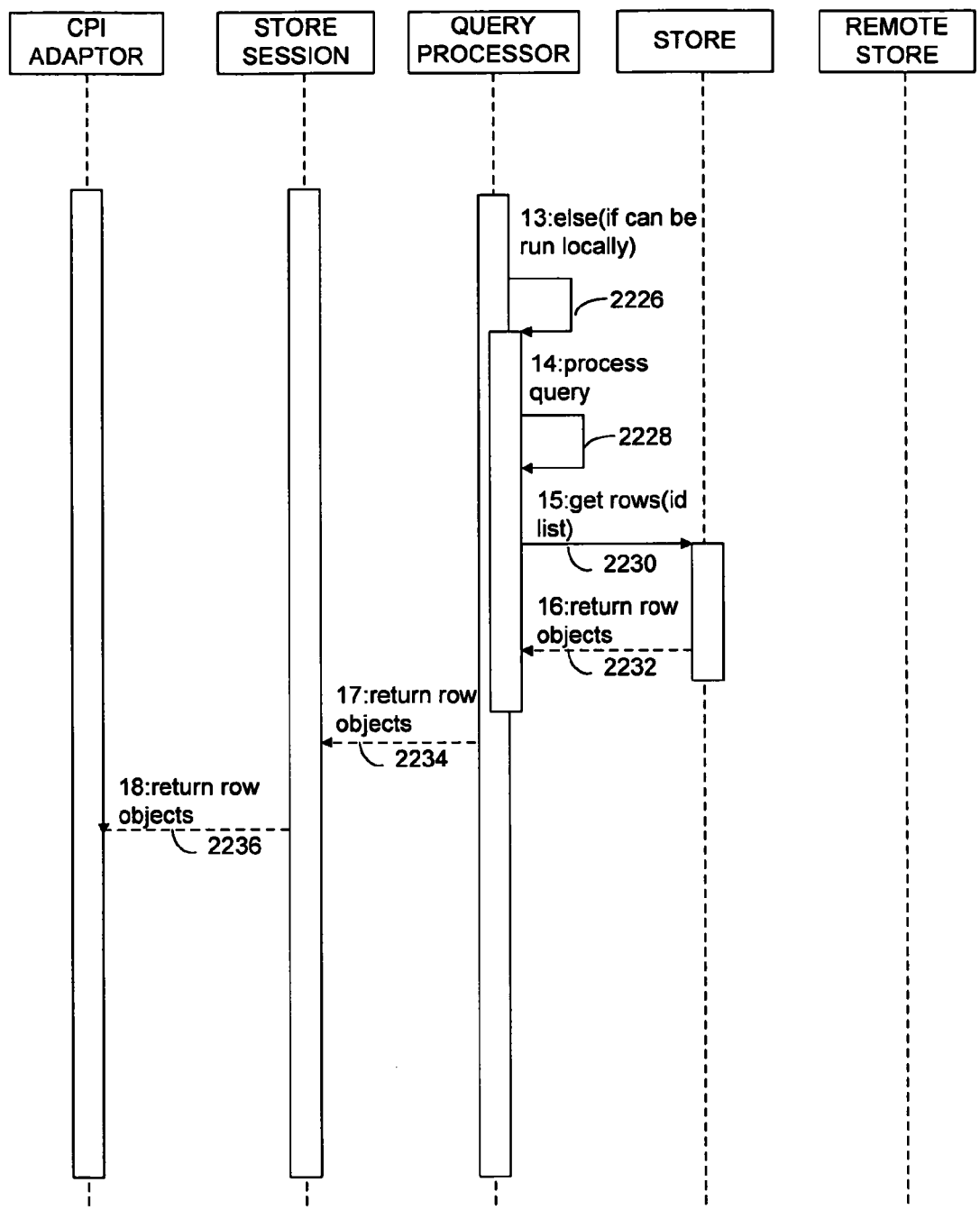

FIG. 22 depicts a sequence diagram for an illustrative query. In the illustrative example, the CPI adaptor prepares the query, including a query tree, and sends the query to the store session (step 2202). The store session forwards the query to the query processor (step 2204). After receiving the query, the query processor requests metadata from the store to compile and optimize the query (step 2206). The metadata describes, for example, the number of columns in tables, the types of columns, and which columns have indices. The store obtains the relevant metadata and returns the metadata to the query processor (step 2208).

The query processor analyzes the metadata to determine whether to execute the query in the remote store (step 2210). In the illustrative example, the query is executed in the remote store if the synchronization strategy requires it or if at least some of the data is in the remote store. When the query is to be executed in the remote store, the query processor flushes the affected tables to the remote store via the store (step 2212). The store receives the query processor's instruction to flush the affected tables and forwards the instruction to the remote store (step 2214). The query processor also submits the query to the remote store, via the store, for execution (step 2216). The store receives the query and forwards the query to the remote store (step 2218). After receiving the query, the remote store executes the query and returns the results to the store (step 2220). The store updates the cache from the results (step 2222) and returns the obtained row object to the query processor (step 2224).

If the query processor determines that the query can be run locally in the store instead of in the remote store (step 2226), then the query processor processes the query locally (step 2228). The query processor requests the relevant rows from the store (step 2230), which in turn returns one or more row objects with the data (step 2232).

After receiving the row objects that include the data, either from the remote store in step 2224 or from the store in step 2232, the query processor returns the row objects to the store session (step 2234). The store session forwards the row objects to the CPI adaptor (step 2236).

Figure 23A:
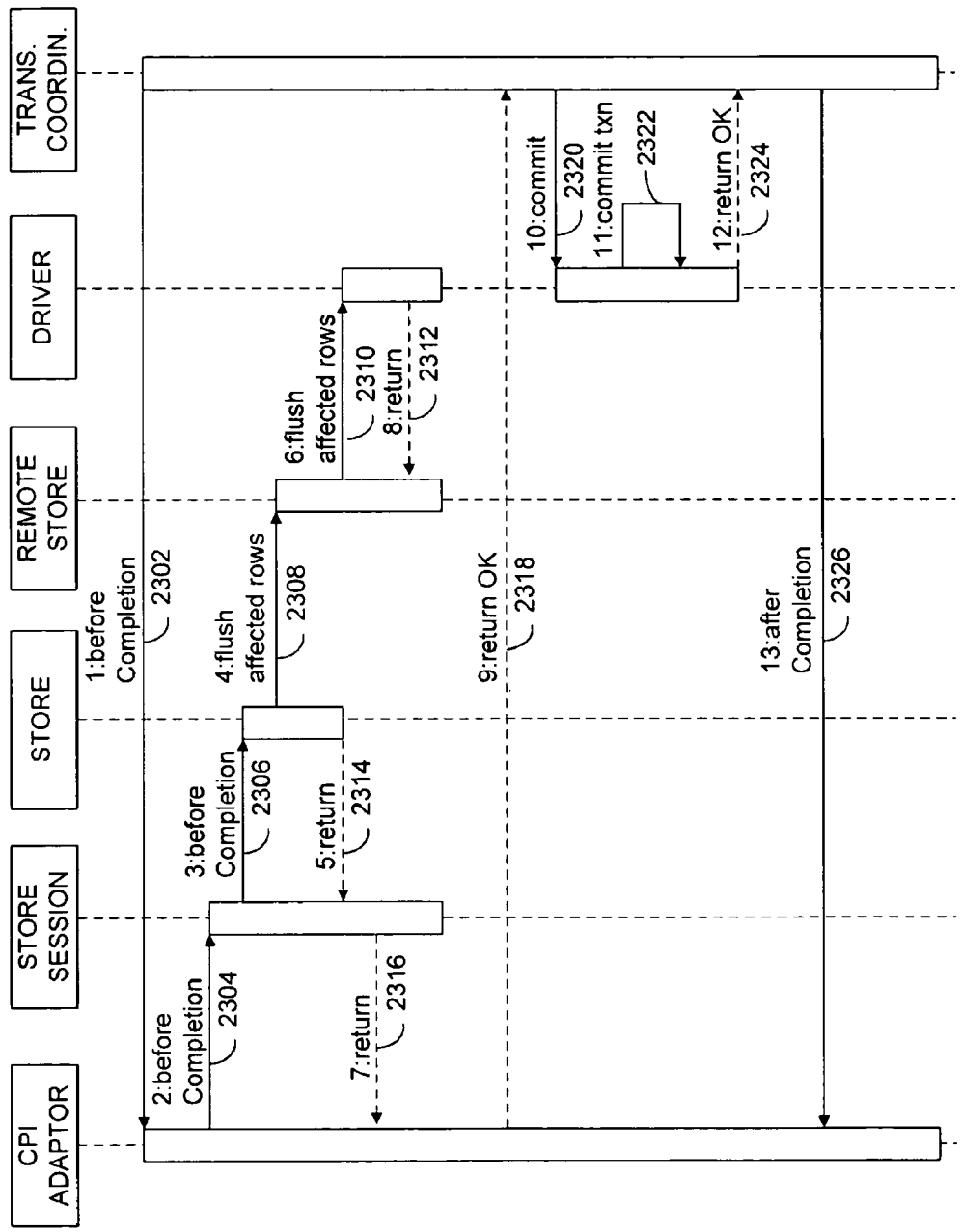
FIGS. 23A and 23B are sequence diagrams showing illustrative steps for committing data in the first illustrative configuration.
Figure 23B:
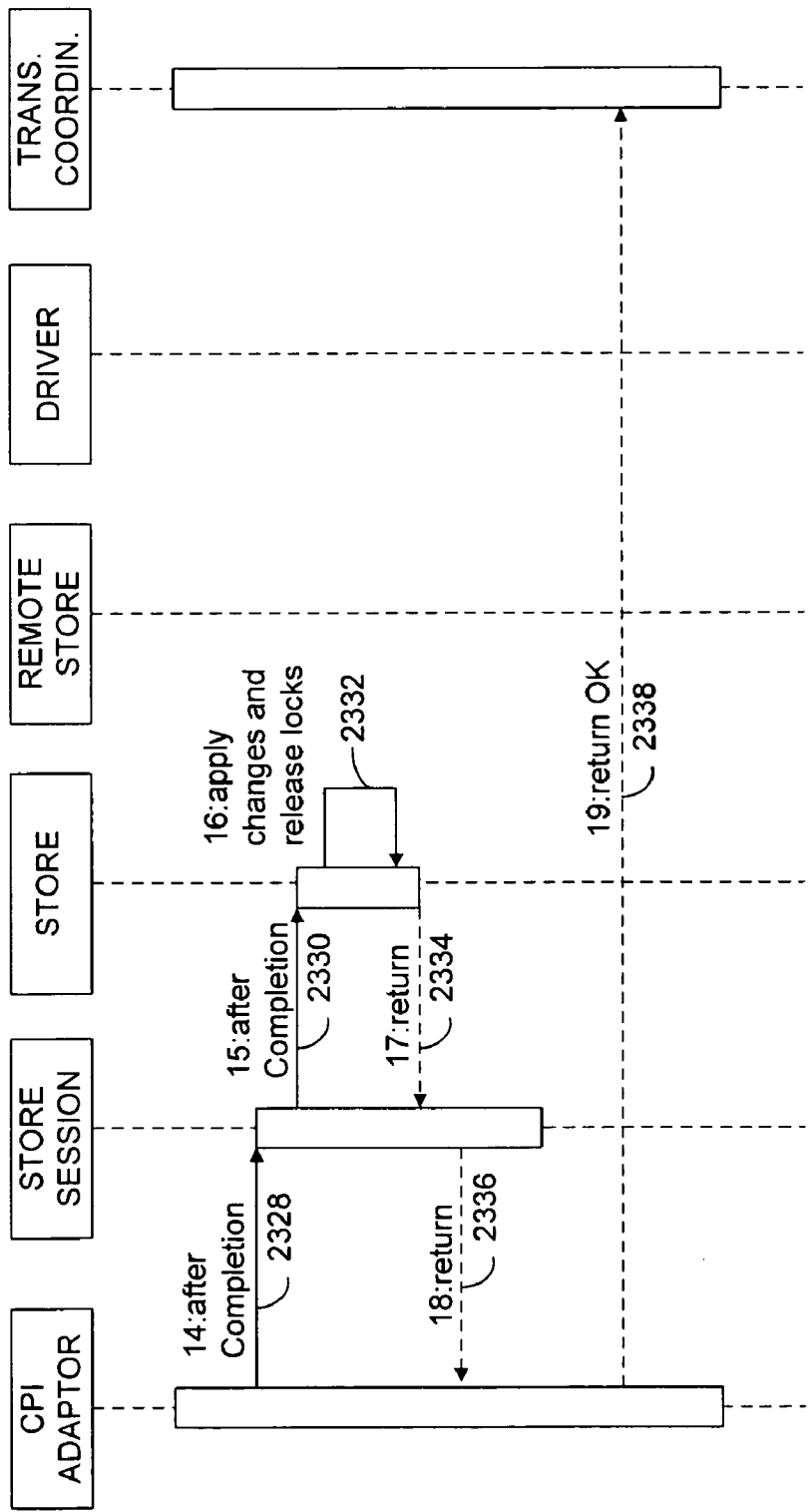

FIG. 23 depicts a sequence diagram for an illustrative commit transaction. The store keeps track of operations that have been performed within a current transaction, and just prior to commit these operations are applied to the remote store. This is a more efficient solution than applying the changes piecemeal throughout the life of the transaction. As shown in FIG. 23, the illustrative transaction commit may occur in four phases: beforeCompletion, prepare, commit, and afterCompletion. These phases may be driven by an external transaction coordinator. For example, the CPI Adapter may be registered to receive synchronization events (beforeCompletion and afterCompletion) and the JDBC driver may be registered as an XAResource and will receive the prepare and commit events.

When the CPI adaptor receives a beforeCompletion event from the transaction coordinator (step 2302), the CPI adaptor forwards a beforeCompletion call to the store session (step 2304). The store session forwards the call to the store (step 2306), which flushes the affected rows to the remote store (step 2308). In turn, the remote store instructs the driver (e.g., the JDBC driver) to flush the affected rows (step 2310). When the flush is completed, the driver signals the remote store that it is clear to return (step 2312). The store passes the return OK to the store session (step 2314), which in turn passes the return OK to the CPI adaptor (step 2316). Then, the CPI adaptor informs the transaction coordinator that the affected rows have been flushed (step 2318).

Then, the driver receives the commit message from the transaction coordinator (step 2320), and commits the transaction (step 2322). Although it is not shown in FIG. 23, a prepare event may also occur. For example, a transaction manager may prepare each resource if there are multiple resources. However, if there is one resource, there may be no need to prepare the resource. When the commit is completed, the driver signals a return OK to the transaction coordinator (step 2324).

The store then receives the afterCompletion call from the CPI adaptor, and the changes are applied and locks held for this transaction within the store are released. That is, the transaction coordinator sends the afterCompletion call to the CPI adaptor (step 2326). The CPI adaptor forwards the call to the store session (step 2328), which in turn forwards the call to the store (step 2330). The store applies the changes and releases the locks (step 2332). Then, the store sends a return OK to the store session (step 2334), which forwards the return OK to the CPI adaptor (step 2336). The CPI adaptor then signals the return OK to the transaction coordinator to identify that the commit transaction has been completed (step 2338).

Illustrative Configurations 2 and 3: Replicated In-Memory Database and Database Cache Plus In-Memory Database:

In the illustrative configuration, a replicated store is a logical store with two physical elements: a primary and hot standby. Although the primary store and the hot standby store are each described as a store, they are perceived by the database application as a single logical store.

Figure 24:
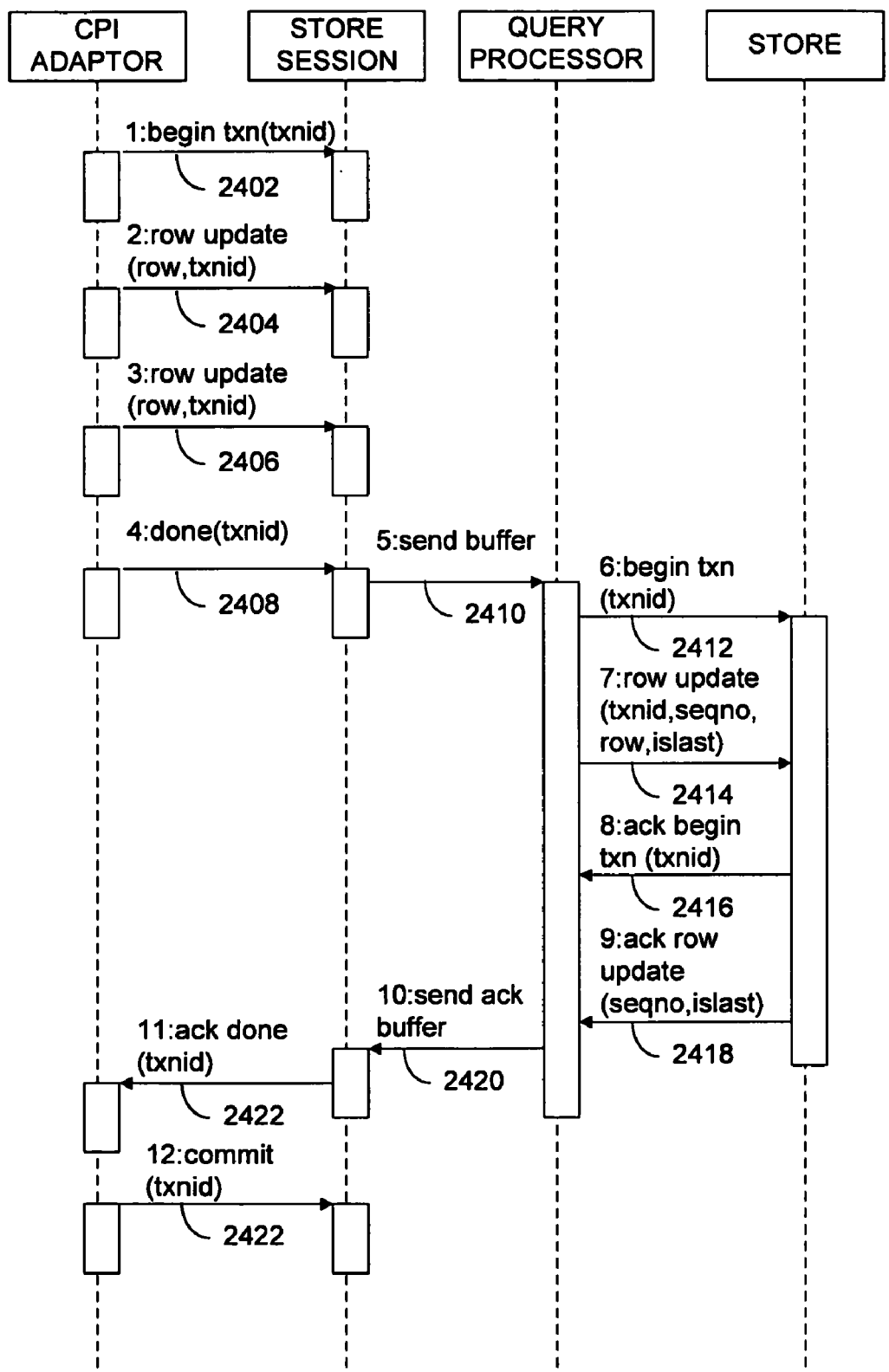
FIG. 24 is a sequence diagram showing illustrative communication between a primary store and a hot standby store.

FIG. 24 is a sequence diagram that shows illustrative communication between a primary store and a hot standby store. The illustrative node communication subsystem provides buffered, asynchronous communication. Messages sent to the node communication subsystem from the store do not need to be immediately sent across the network. The node communication subsystem may, for example, buffer messages and send the buffered messages to the replica when it is full. Further, messages sent to the node communication subsystem from the store and messages sent between replicas over the network are transmitted asynchronously and do not require immediate acknowledgment.

In FIG. 24, half-arrows indicate asynchronous messages. The illustrative scenario shows messages for a single transaction, however, the node communication subsystem may receive messages for multiple simultaneous transactions, potentially from multiple stores within the same node. The primary store sends a begin transaction message to the primary node communication instance (step 2402). The illustrative begin transaction message identifies the transaction to the primary node communication instance. After sending the begin transaction message in step 2402, the primary store sends a first update row message to the primary node communication instance (step 2404). The first update row message identifies the transaction and the row to update in the backup store. In the example, the primary store effects two updates to the same row by sending a second update row message (step 2406). As described below, the two update row messages result in a single update row message on the standby replica, because there are two updates to the same row. After sending the update row messages, the primary store sends a "done" message to the primary node communication instance to indicate that there are no additional update messages (step 2408).

The primary node communication instance buffers the update messages in the illustrative example and then sends them to the standby node communication instance (step 2410). The standby node communication instance initiates the update of the standby store by sending a begin transaction message (step 2412). Then, the standby node communication instance also sends an update row message (step 2414). This update row message includes both changes to the relevant row. The "done" message is incorporated into the last change record using an "islast" parameter. This provides a small reduction in the number of network messages, and may prevent an extra packet being sent over the network.

The standby store acknowledges the begin transaction message (step 2416), updates the row as described in the update message, and acknowledges that the row is being updated (step 2418). The standby node communication instance forwards the acknowledgement message to the primary node communication instance (2420), which in turn forwards the acknowledgement to the primary store (step 2422). Then, the primary store issues a commit message to commit the update (step 2424). Commit transactions are described below.

Figure 25:
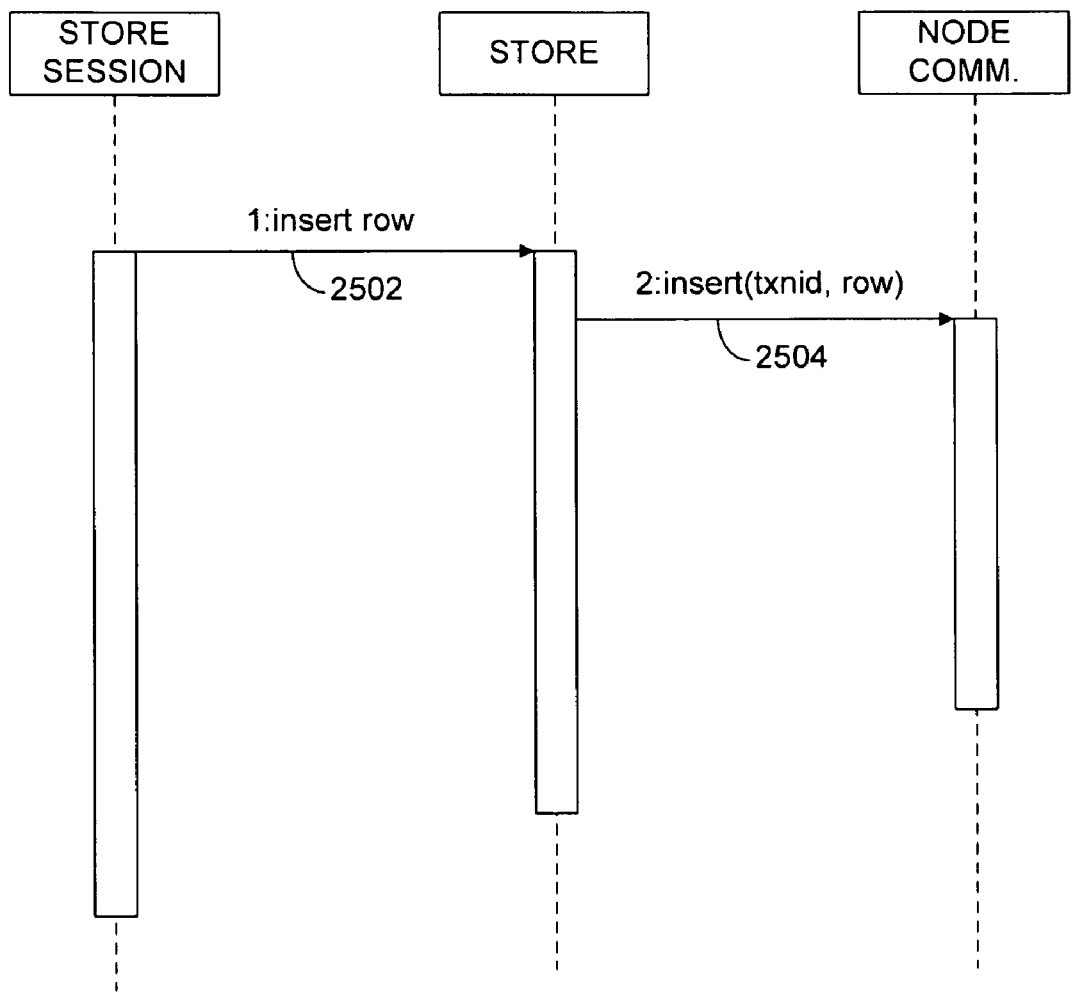
FIG. 25 is sequence diagram showing additional steps for inserting a row when there is a replicated store.

FIG. 25 is a sequence diagram showing additional steps for inserting a row. In the illustrative example, the additional steps comprise posting the insert record to the node communication system for each inserted row. The store session sends an insert row message to the store (step 2502). Then, the store forwards the message to the node communication subsystem (step 2504).

Figure 26:
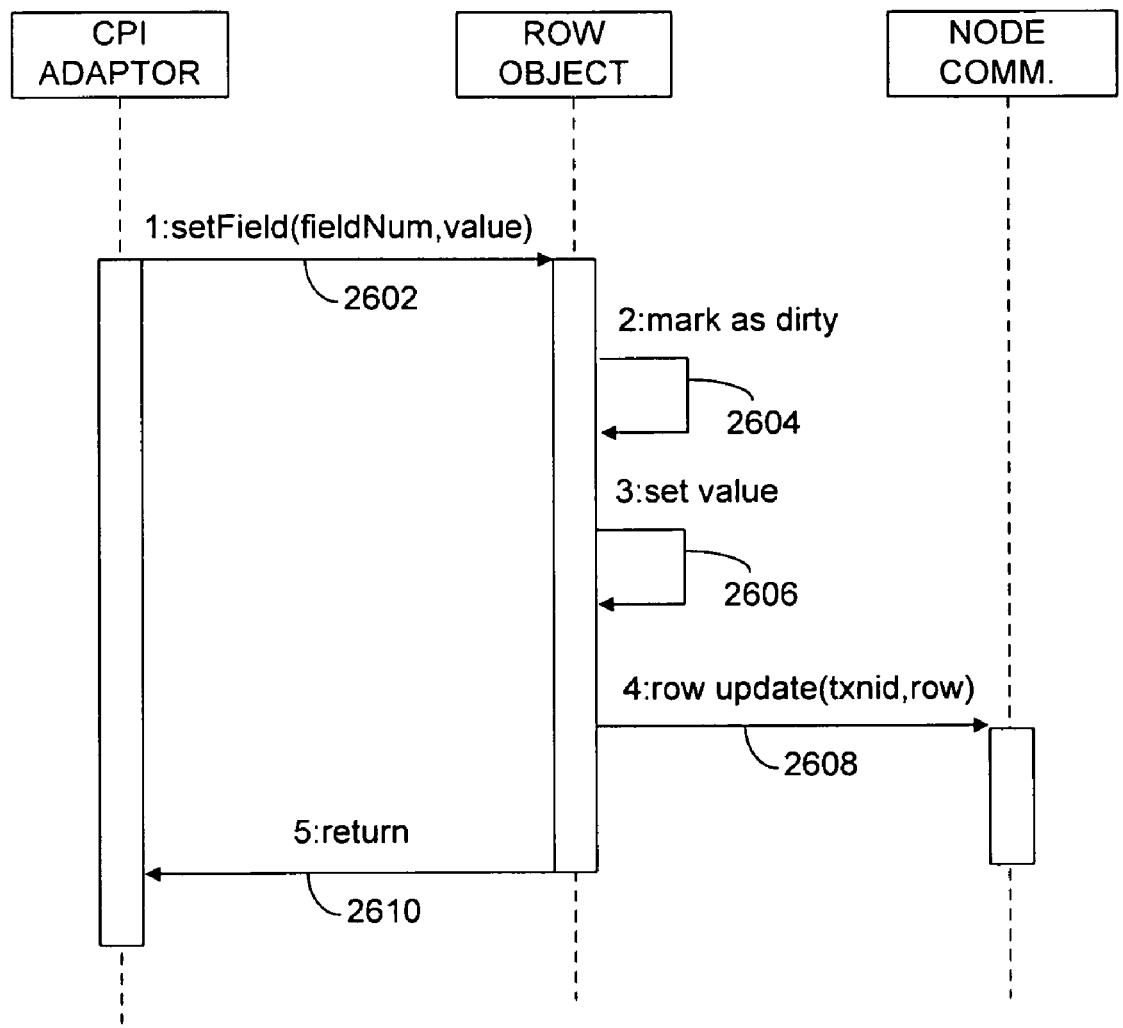
FIG. 26 is a sequence diagram showing illustrative steps for updating a field in a row in a cache when there is a replicated store.

When a row is updated, the store sends an update record message to the node communication subsystem. As described above, multiple updates to the same row are "combined" into a single update message to the standby replica. FIG. 26 is a sequence diagram showing illustrative steps for updating a field in a row in a cache. In the illustrative example, when a field is updated, the modification is made in the row object but is not applied to the underlying row until the transaction commits. First, the CPI adaptor sends a request to update a field to the row object (step 2602). The request identifies the field (e.g., by the field's number) and includes the value to be entered into the field. Then, the row object marks the row as dirty (step 2604) and sets the value in the field (step 2606). The row object then sends a row update message to the node communication subsystem (step 2608) and notifies the CPI adaptor that the row has been updated (step 2610).

Figure 27:
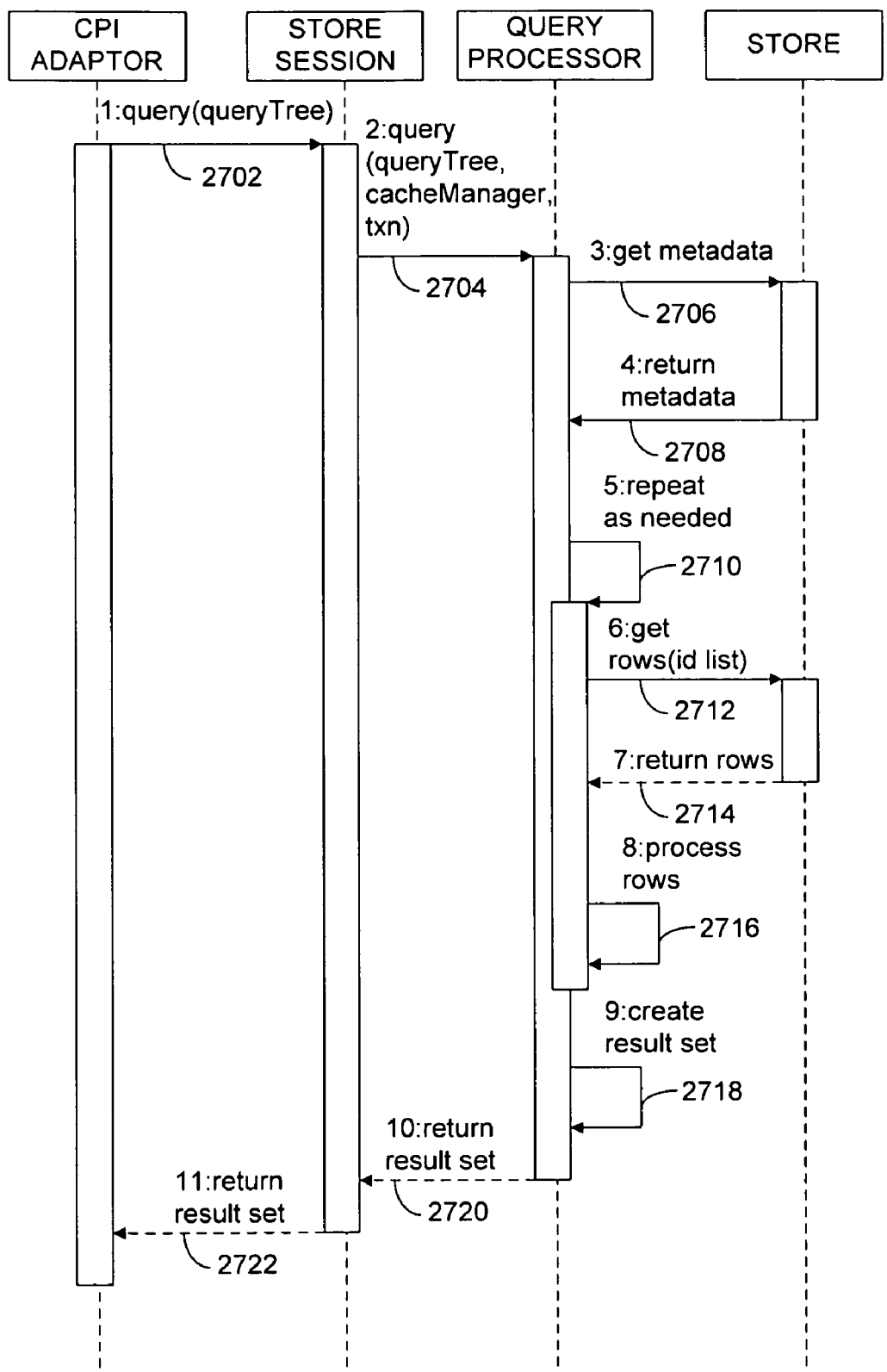
FIG. 27 is a sequence diagram showing illustrative steps for querying a store when there is a replicated store.

When querying in this configuration, the system does not have to interact with a backing store. The cache keeps track of whether information is stored in the cache or in the backing store. If the information is in the cache, then the system does not have to interact with the backing store. FIG. 27 is a sequence diagram that shows an illustrative query transaction. In the illustrative example, the CPI adaptor prepares the query, including a query tree, and sends the query to the store session (step 2702). The store session forwards the query to the query processor (step 2704). After receiving the query, the query processor requests metadata from the store to compile and optimize the query (step 2706). The store obtains the relevant metadata and returns the metadata to the query processor (step 2708).

The query processor determines whether there are additional rows to obtain (step 2710). If there are additional rows to obtain, the query processor requests the relevant rows from the store (step 2712), which in turn returns one or more row objects with the data (step 2714). If there are no additional rows to obtain, the query processor processes the rows (step 2716) and creates a result set (step 2718). Process rows may include, for example, selecting a subset of data from the rows and determining which rows satisfy the query. The result set may be, for example, the selected and combined rows. After creating the result set, the query processor sends the result set to the store session (step 2720), which forwards the result set to the CPI adaptor (step 2722).

Figure 28:
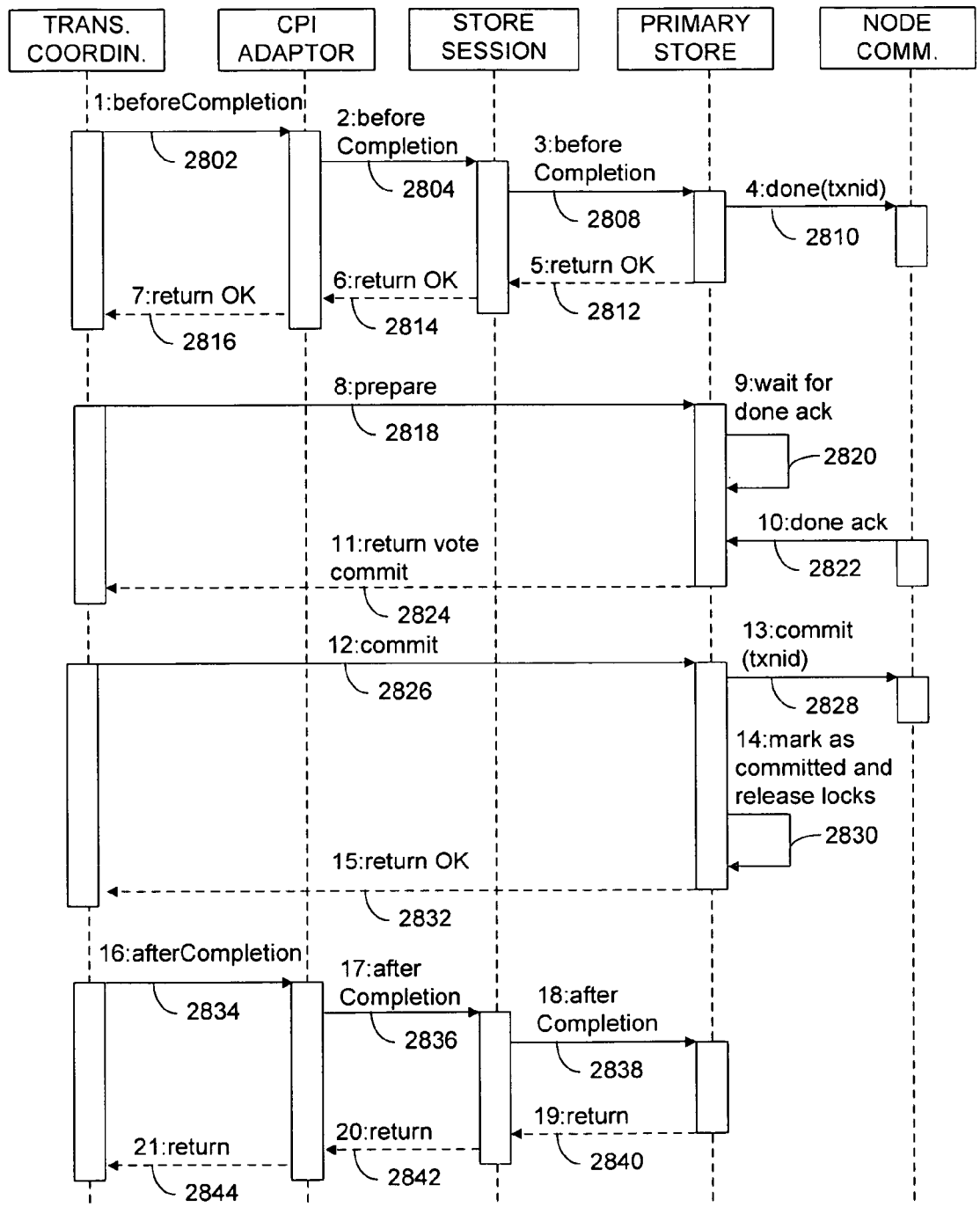
FIG. 28 is a sequence diagram showing illustrative steps for a two-phase commit transaction when there is a replicated store.

In the client/server configuration, transactions may be committed in either two phases or one phase. Similar to the commit transaction described with respect to FIG. 23, the illustrative transaction commit for the client/server configuration may occur in four phases: beforeCompletion, prepare, commit, and afterCompletion. These phases may be driven by an external transaction coordinator. For committing transactions in two phases, a store may be registered as an XA resource manager with the external transaction coordinator. The CPI adapter implements the synchronization interface and is registered with the external transaction coordinator so it can receive beforeCompletion and afterCompletion events. As shown in FIG. 28, the transaction coordinator sends a beforeCompletion event to the CPI adaptor (step 2802). The CPI adaptor forwards the beforeCompletion event to the store session (step 2804), which in turn forwards the event to the primary store (step 2808). Then, the primary store sends a "done" message to the primary node communication instance (step 2810). It does not need to wait for acknowledgment from the standby cache but can return immediately to the caller. After sending the done message, the primary store sends a return OK message to the store session (step 2812). The store session forwards the return OK message to the CPI adaptor (step 2814), which in turn forwards the return OK message to the transaction coordinator (step 2816).

In the prepare phase, the transaction coordinator sends a prepare message to the primary store (step 2818). When the primary store receives the prepare message from the transaction coordinator, it waits for a done acknowledgment from the standby replica (step 2820). Once it has this acknowledgment, it returns a vote commit message to the transaction coordinator, as now it knows that the standby is prepared to commit the transaction.

The transaction coordinator initiates the commit phase by sending a commit message to the primary store (step 2826). Then, the primary store sends an asynchronous commit message to the primary node communication instance (step 2828). Since the primary store's commit message is asynchronous, it does not have to wait for a response from the standby store. When the standby store acknowledges the last change record for the transaction, it will commit the transaction. The primary store then marks the data as committed and releases locks on the data (step 2830), and then sends a return OK message to the transaction coordinator to signal that the commit has been completed (step 2832).

After the commit phase has ended, the transaction coordinator sends an afterCompletion message to the CPI adaptor to initiate the afterCompletion phase (step 2834). The CPI adaptor forwards the afterCompletion message to the store session (step 2836), which in turn forwards the message to the primary store (step 2838). The primary store acknowledges the afterCompletion message by sending a return OK message back to the transaction coordinator (step 2840) via the store session (step 2842) and the CPI adaptor (step 2844).

Figure 29:
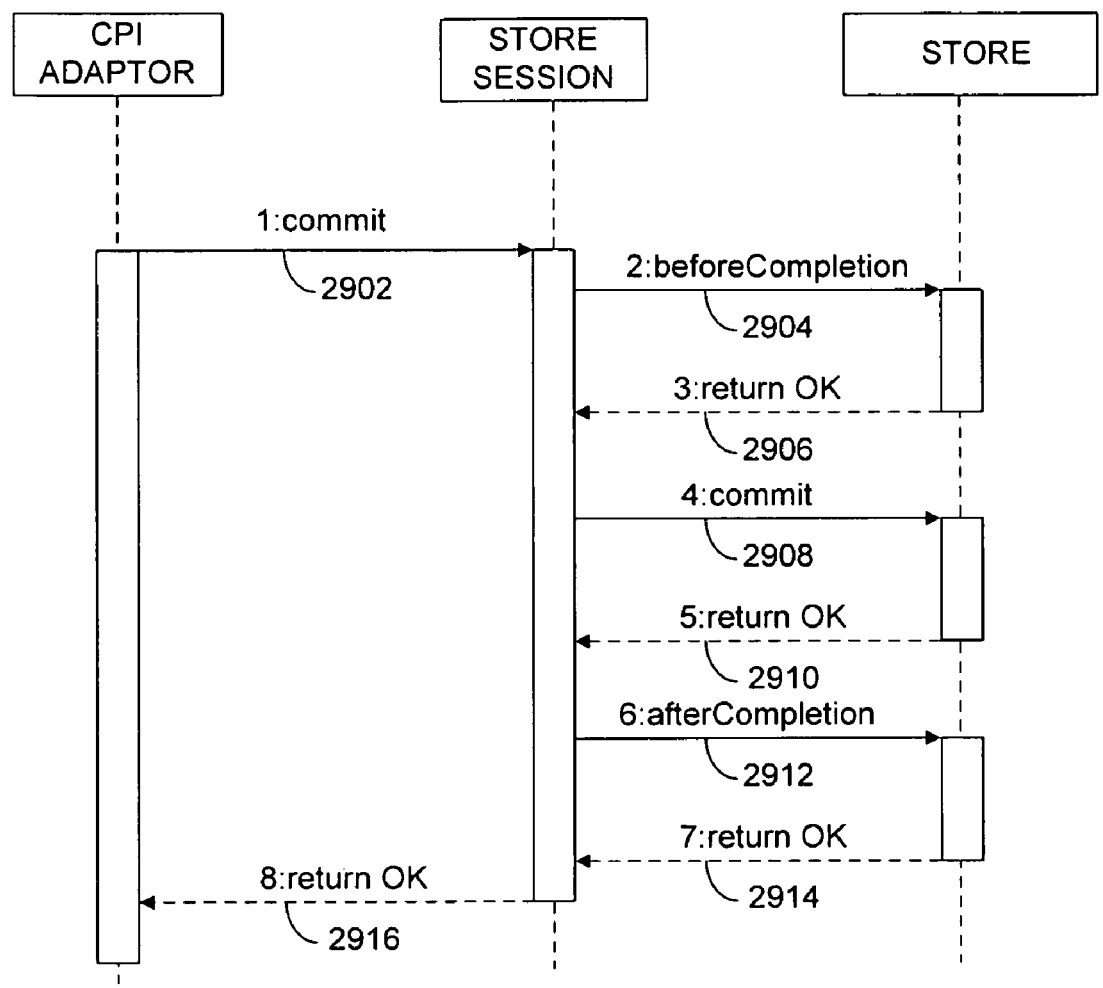
FIG. 29 is a sequence diagram showing illustrative steps for a one-phase commit transaction when there is a replicated store.

In another illustrative example, an external transaction coordinator is not involved and the CPI adaptor is responsible for committing the transaction. In this case, the CPI adaptor submits the commit request, and the session store initiates the four commit phases. As shown in FIG. 29, the CPI adaptor asks the store session to commit the data (step 2902). The store session sends a beforeCompletion message to the store (step 2904). After receiving a return OK from the store (step 2906), the store session sends a commit message to the store (step 2908). The store signals that the data has been committed by sending another return OK message to the store session (step 2910). In the afterCompletion phase, the store session sends an afterCompletion message to the store (step 2912) and receives back a return OK message from the store (step 2914). In response, the store session forwards the return OK message to the CPI adaptor to signal that the afterCompletion phase is done (step 2916).

When the primary replica becomes unavailable, the standby cache may take over the role of primary. How this is initiated depends on whether or not the store is running in its own separate process (e.g., as a server) or whether it is running embedded in an application process. If the store is running in-process with the application, then the application detects whether the primary has become unavailable and notifies the standby replica that it needs to take over as the primary. The reason for this is because the application failure detection and takeover is entwined with store failure detection and takeover in the illustrative example. In this case, the application provides an implementation of the node manager and communicates with the store through a node manager interface to notify the standby store that it needs to take over as the primary replica.

If the store is running in client/server mode, then a node manager that is separate from the application detects whether the primary is unavailable and notifies the standby that it needs to take over.

Once a standby has been notified it needs to take over as the primary, it rolls back incomplete transactions. It also keeps open transactions for which it had prepared to commit by sending the done message to the primary replica. For these transactions, it will commit or roll back once it receives instructions from the transaction coordinator.

Figure 30:
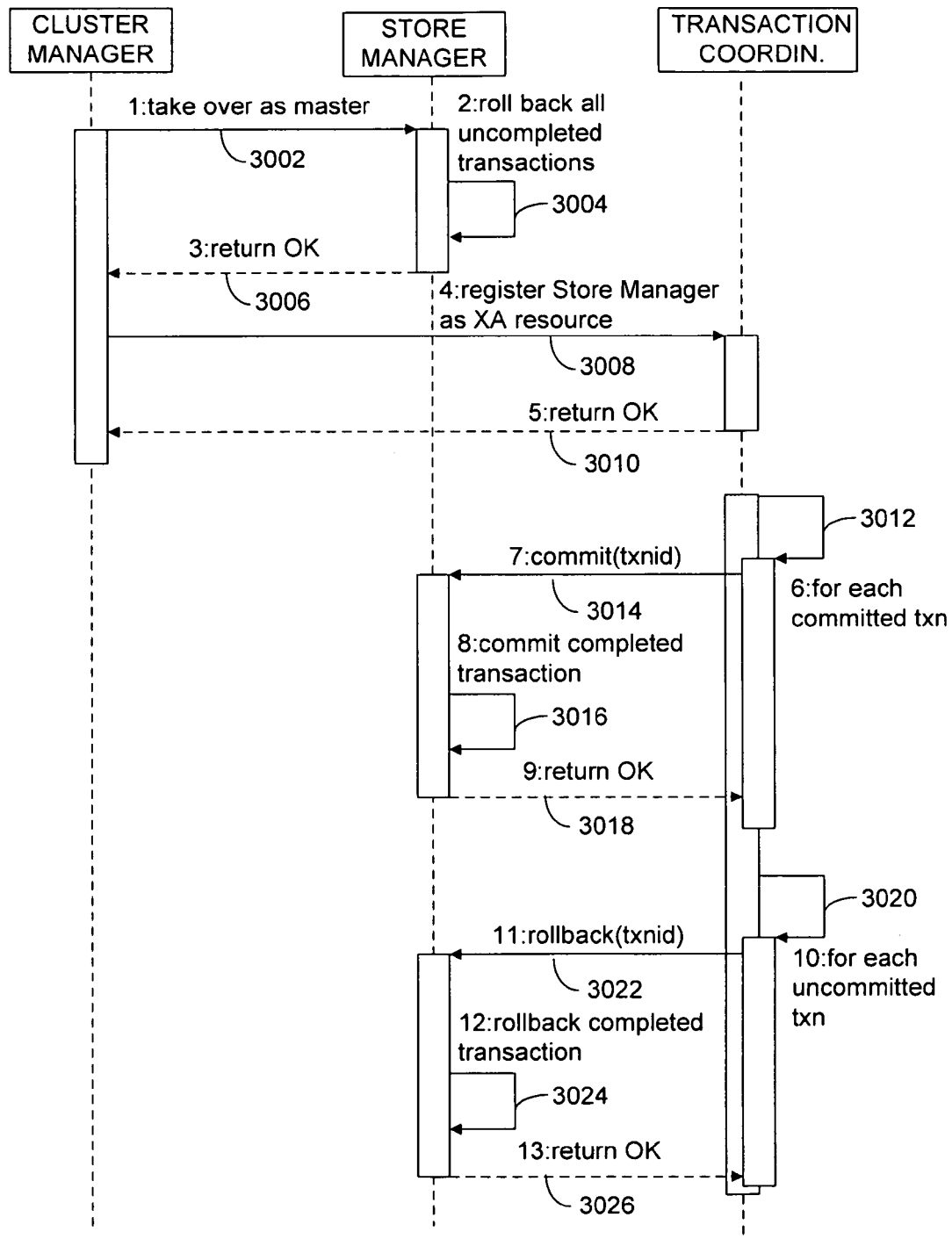
FIG. 30 is sequence diagram showing illustrative steps for a standby cache taking over the role of primary.

FIG. 30 is a sequence diagram that shows illustrative steps for a standby cache taking over the role of primary. This may occur, for example, on crash of the primary. First, the cluster manager notifies the standby store that it needs to take over as primary (step 3002). The standby store rolls back uncompleted transactions (step 3004), and sends a return OK message when completed (step 3006).

Then, the cluster manager registers the standby store as an XA resource with the transaction coordinator (step 3008). After registering the standby store, the transaction coordinator acknowledges that the standby store has been registered as the primary (step 3010). The transaction coordinator then determines whether there are committed transactions for which the standby has prepared to commit (step 3012). For each of these transactions, the transaction coordinator instructs the standby store to commit (step 3014). In response, the standby store commits each completed transaction (step 3016), and returns a return OK message to the transaction coordinator (step 3018).

The transaction coordinator also determines whether there are uncommitted transactions for which the standby store has prepared to commit (step 3020). For each of these transactions, the transaction coordinator instructs the standby store to rollback (step 3022). In response, the standby store rolls back each completed transaction (step 3024), and returns a return OK message to the transaction coordinator (step 3026).

The node then takes on the role of primary and begins accepting requests from CPI Adaptors. In an illustrative example, it does not replicate transactions until it detects that a replica is available again. At that point, it participates in a recovery process and then begins replicating to the new standby replica.

Similarly, in the case where the secondary crashes, the primary does not replicate transactions until it detects that a replica is available again. At that point, it participates in a recovery process and then begins replicating to the new standby replica.

In the illustrative example, there are two ways for a node to recover. The first is called repair, where the standby node gets a full copy of the data from the primary replica. The second is called recovery, where the standby is able to get at least some of its data from a local copy stored in local shared memory. Recovery may be faster than repair, except perhaps in deployments where RDMA is available. Recovery therefore may be attempted first, before falling back to repair.

Figure 31:
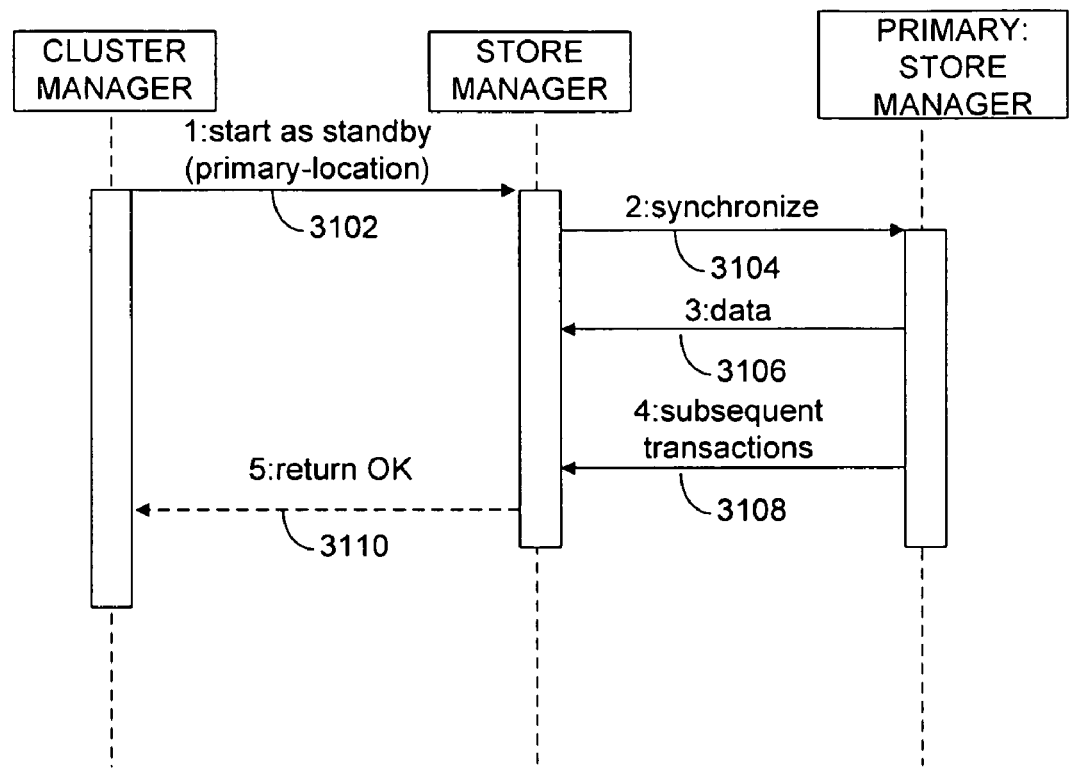
FIG. 31 is a sequence diagram showing illustrative steps for a repair operation.

FIG. 31 is a sequence diagram that shows illustrative steps for a repair operation. First, the node manager initializes the store by indicating it is the standby and letting it know the location of the primary (step 3102). Then, the standby contacts the primary to obtain a snapshot of the current data in the store (step 3104). In response, the primary sends the data to the standby (step 3106). The primary then sends subsequent transactions that have occurred since the snapshot was taken (step 3108). The standby signals to the node manager that the data has been received (step 3110). The standby is then considered up-to-date.

Figure 32:
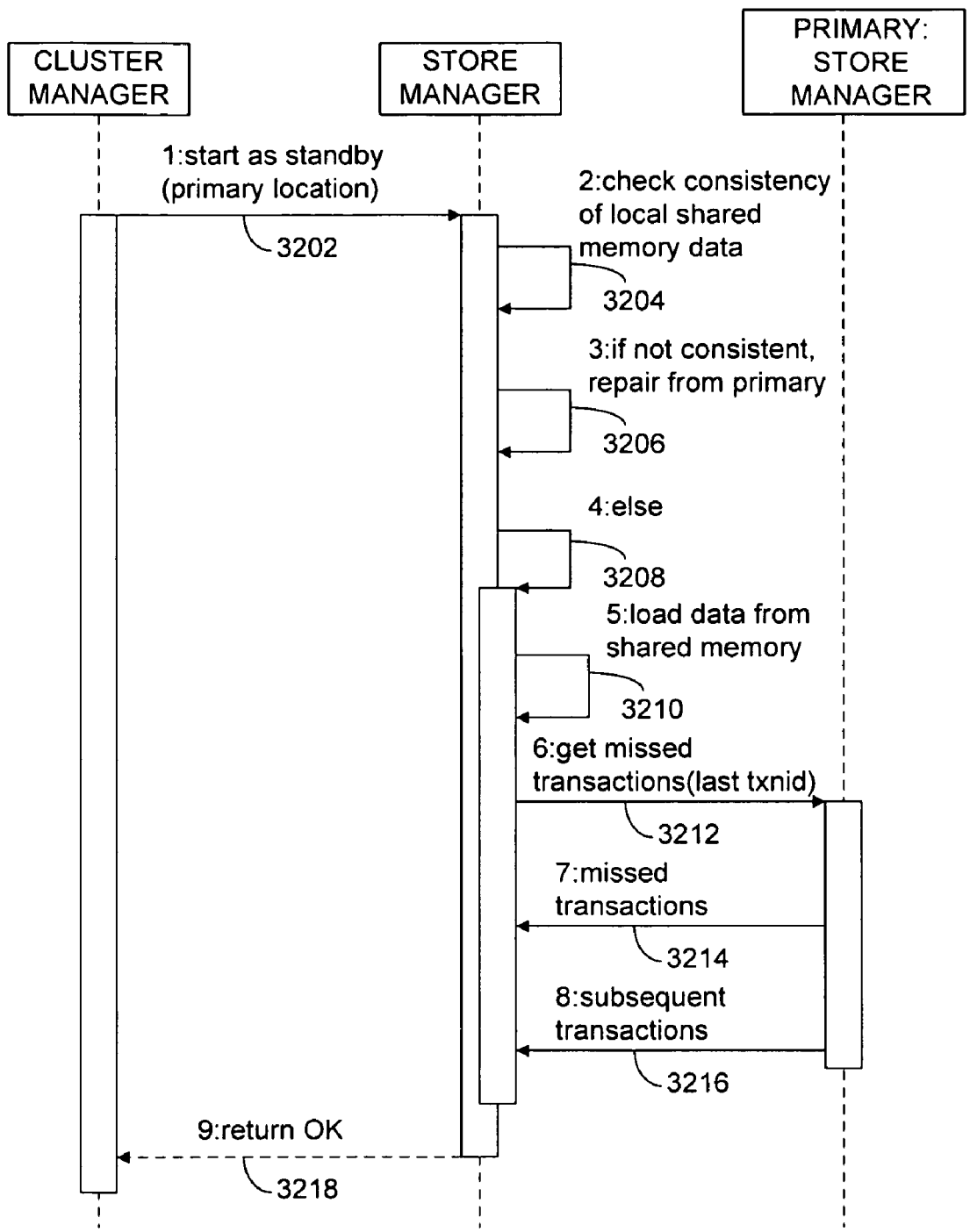
FIG. 32 is a sequence diagram that shows illustrative steps for a recovery operation.

In the recovery scenario, a local copy of the data is available in shared memory or some other local storage, and the node can recovery from the local copy. As shown in FIG. 32, prior to loading the data, the store first ensures that the local copy is consistent. If the local copy is not consistent, then the store falls back to repairing from the primary replica. The node manager initiates replication by placing the store in standby and letting it know the location of the primary (step 3202). The standby then checks the consistency of the local copy of the data (step 3204). If the local copy of the data is inconsistent, then the store repairs from the primary replica (step 3206). Otherwise, the store recovers from the local copy (step 3208). To recover from the local copy, the store loads the data from its local storage location, such as shared memory (step 3210). Then, the store requests transactions that may have been missed from the primary (step 3212). The request identifies the last transaction, so that the primary may identify missed transactions. The primary returns missed transactions (step 3214) and subsequent transactions (step 3216) to the store. The store notifies the node manager that recovery has been completed by sending a return OK message (step 3218). Transfer time can be decreased during recovery, for example, by implementing recovery using RDMA.

In a situation where there is replication, there is the risk of network partitioning, where both replicas are up and running but they have lost communication with each other. Each replica may then assume the role of primary, and there is a risk of data conflicts if transactions are allowed to continue against both replicas. Methods, systems, and articles of manufacture consistent with the present invention avoid data conflicts by having the node manager implement one or more policies to handle network partitioning. In various embodiments, the illustrative policies include: the node with the most recent transaction wins, and the other node repairs from this node; the node with the most activity wins; an attempt to merge is made, and conflicts are logged or otherwise reported, so that the user can manually resolve these conflicts; the user manually decides which node wins; the user initiates a merge, and interactively resolves conflicts; and avoiding partitioning by using a quorum algorithm in which a replica will not become primary unless it knows that it can communicate with a quorum of other nodes.

Illustrative Configuration 4: Client/Server in Memory Database

The client/server scenario relates to a single virtual memory cache (i.e., not partitioned or replicated), where the backing store is a sub-store rather than a database. The above-described semantics of a single virtual memory cache apply to a cache client. Having a sub-store client behave as a local cache to a sub-store server not only simplifies the internal architecture; it also enables the local client to have similar performance characteristics to a single virtual memory cache. This configuration provides significantly better performance than a cache to a traditional SQL database, because the local cache does not have to pay the cost of translating to SQL, and the sub-store server may store its data in memory.

When the remote store is a replicated store, the client is provided with information about both the primary and the replica, and is able to transparently reconnect to the replica if the primary fails. Failover and retry are discussed above.

Illustrative Configurations 5-8: Partitioned Cache, Replicated Cache, Cache Plus Multiple Databases, and Partitioned In-Memory Database A distributed store may be a partitioned store or a distributed store, or both. The distributed store may be a cache or an in-memory database, or both. For example, a partitioned in-memory database may be a cache for another in-memory database or backing store. A partitioned store is one in which the data for a single logical store is partitioned across multiple physical partitions in order to obtain better scalability. When a partitioned store is used as a cache, this may provide high scalability. When a store is replicated, this may provide high availability.

When a client connects to a partitioned store to establish a session, the client connects to a particular node. In a partitioned store that is also replicated, a node may host the primary replica for a partition and the standby replica for another partition. When a client connects to a node, the server side of the native remote store subsystem establishes a store session with primary partition for that node. Requests for the client are then dispatched to that store session. The client may connect to any one of a number of nodes.

A partitioned store may act as a server, or as a remote store, for an embedded client cache store running in the same virtual memory as an application. In this scenario, the remote store receives changes just prior to the transaction being committed. The client-server communications between a client and a remote store may be optimized to take advantage of this functionality and provide an interface that allows for a batch of inserts and updates to be communicated with as few network round-trips as possible. Further, a distributed cache or in-memory database may be configured to be a backing store for another distributed cache.

Figure 33A:
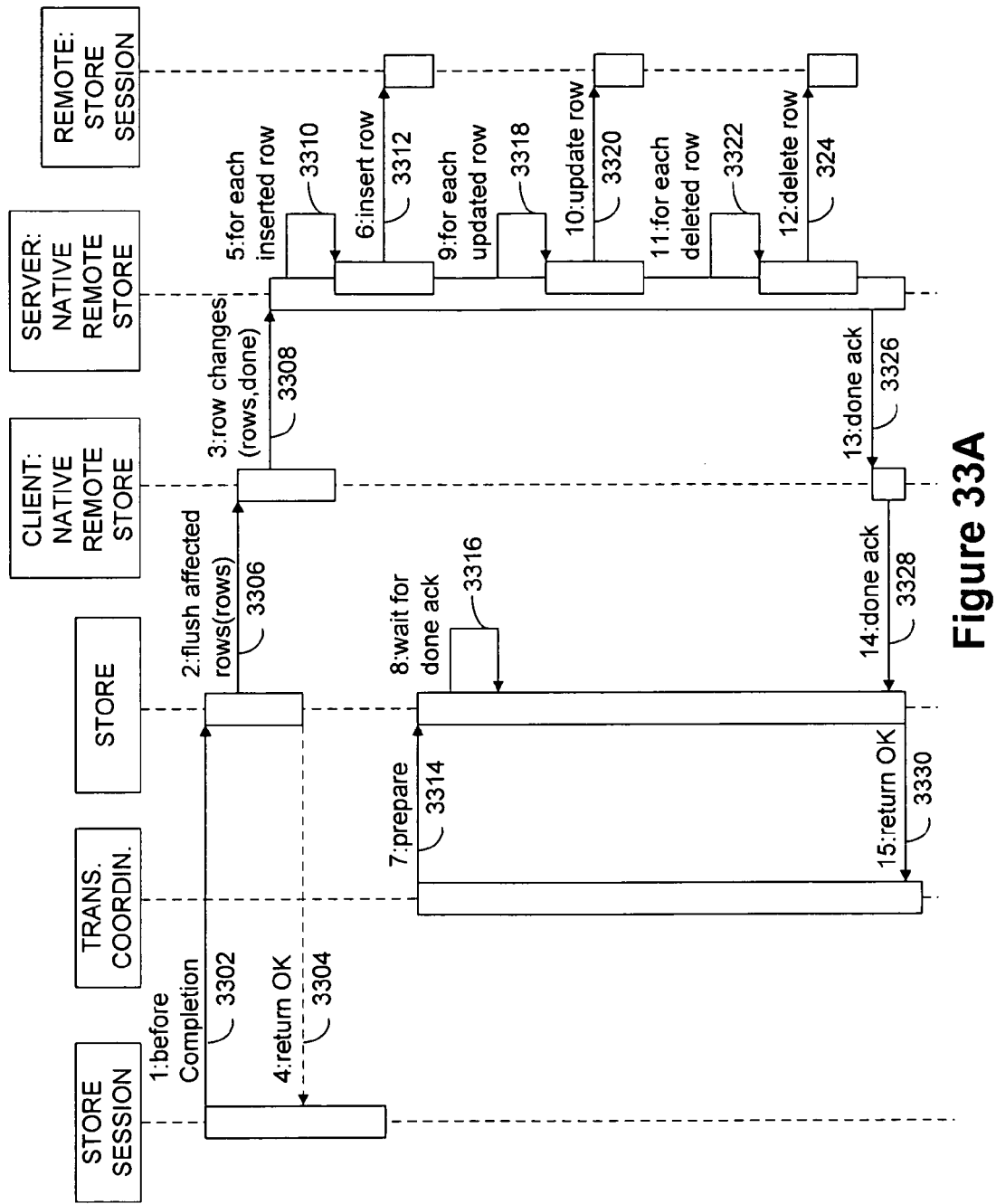
FIGS. 33A and 33B are sequence diagrams that depict illustrative steps for communication between a client and server for a partitioned store.
Figure 33B:
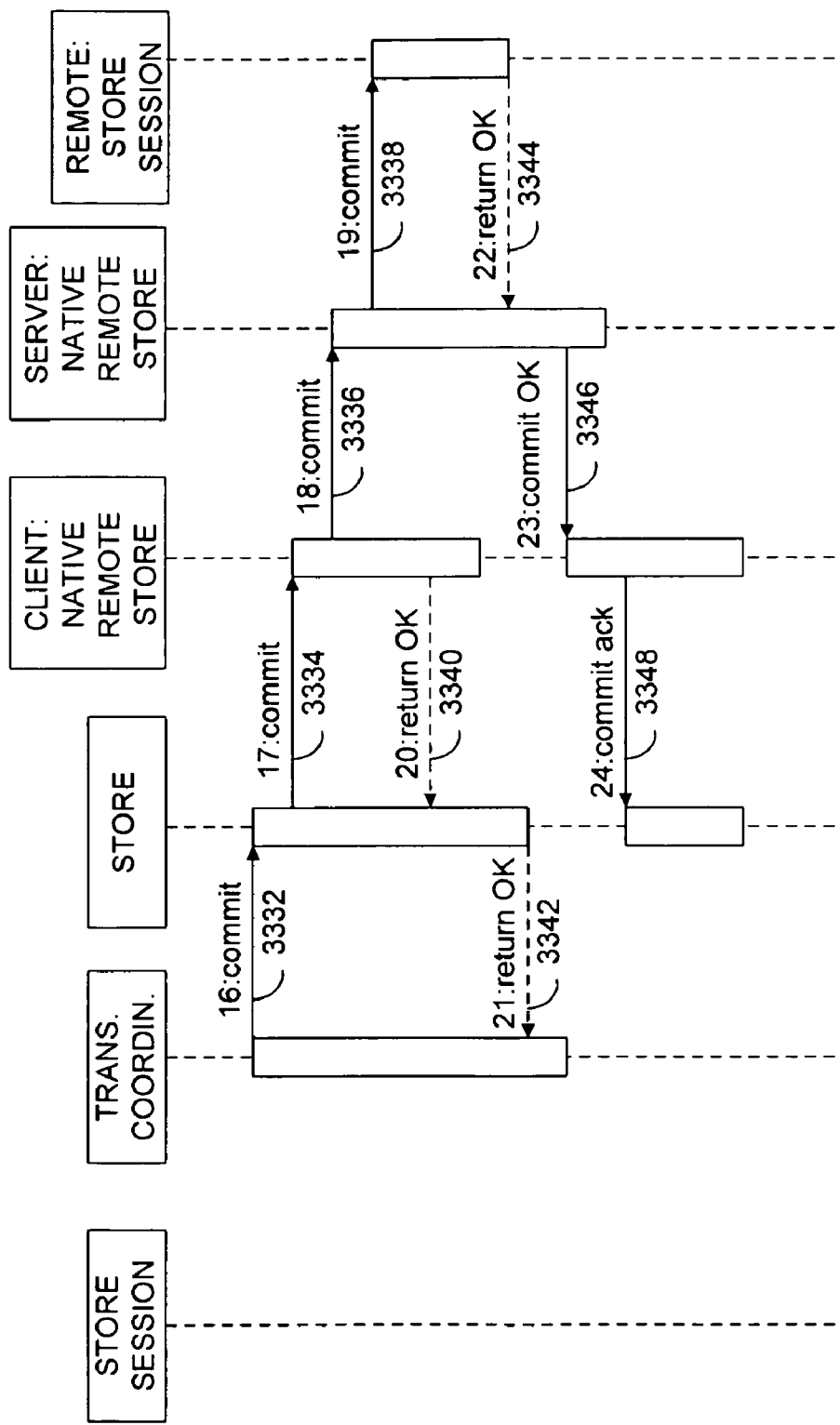

FIG. 33 is a sequence diagram that depicts illustrative steps for communication between a client and server. In the illustrative example, modified rows for a transaction are sent in a single network message. Further, the communications between the store and client remote store and between the client and server remote stores are asynchronous. In the illustrative example, the store on the client is registered as an XA resource and receives the prepare and commit commands from the transaction coordinator. Therefore, the partitioned store is treated as a single resource from the perspective of the client's transaction coordinator.

The store session initiates communication by sending a beforeCompletion message to the store (step 3302). The store identifies to the client native remote store the affected rows that are to be flushed (step 3306), and sends a return OK message to the store session (step 3304). Then, the client native remote store notifies the server native remote store of the changes made to the rows (step 3308). Changes may include, for example, inserts, updates, and deletions of rows. The server native remote store determines whether there are rows to insert (step 3310). For each inserted row, the server native remote store instructs the remote store session of the inserted row (step 3312). For each updated row (step 3318), the server native remote store instructs the remote store session of the updated row (step 3320). Further, for each deleted row (step 3322), the server native remote store instructs the remote store session of the deleted row (step 3324). Then, the server native remote store returns a done acknowledgement message to the client native remote store (step 3326).

The transaction coordinator sends a prepare command to the store (step 3314), which waits for a done acknowledgement message from the client native remote store (step 3316). After receiving the done acknowledgement from the server native remote store in step 3326, the client native remote store sends the done acknowledgement message to the store (step 3328). Then, the store sends a return OK message to the transaction coordinator to signal that the prepare phase is completed (step 3330).

During the commit phase, the transaction coordinator sends a commit message to the store (step 3332). The store then forwards the commit message to the client native remote store (step 3334), which also forwards the commit message to the server native remote store (step 3336). In turn, the server native remote store instructs the remote store session to commit the data (step 3338). After committing the data, the remote store session sends a return OK message to the server native remote store (step 3344). Then, the server native remote session store sends a commit acknowledgement message to the client native remote session store (step 3346), which in turn sends a commit acknowledgement message to the store (step 3348).

If a partitioned store acts as a cache to a backend database, then the partitioned store would implement the commit message as a distributed transaction spanning, for example, JDBC connections across multiple machines, using a distributed transaction coordinator. However, from the client's perspective, and from the perspective of the transaction coordinator servicing the client, it would still appear as a single resource committing a single transaction. In this illustrative example, there are two levels of transaction coordinators participating in this transaction.

Figure 34:
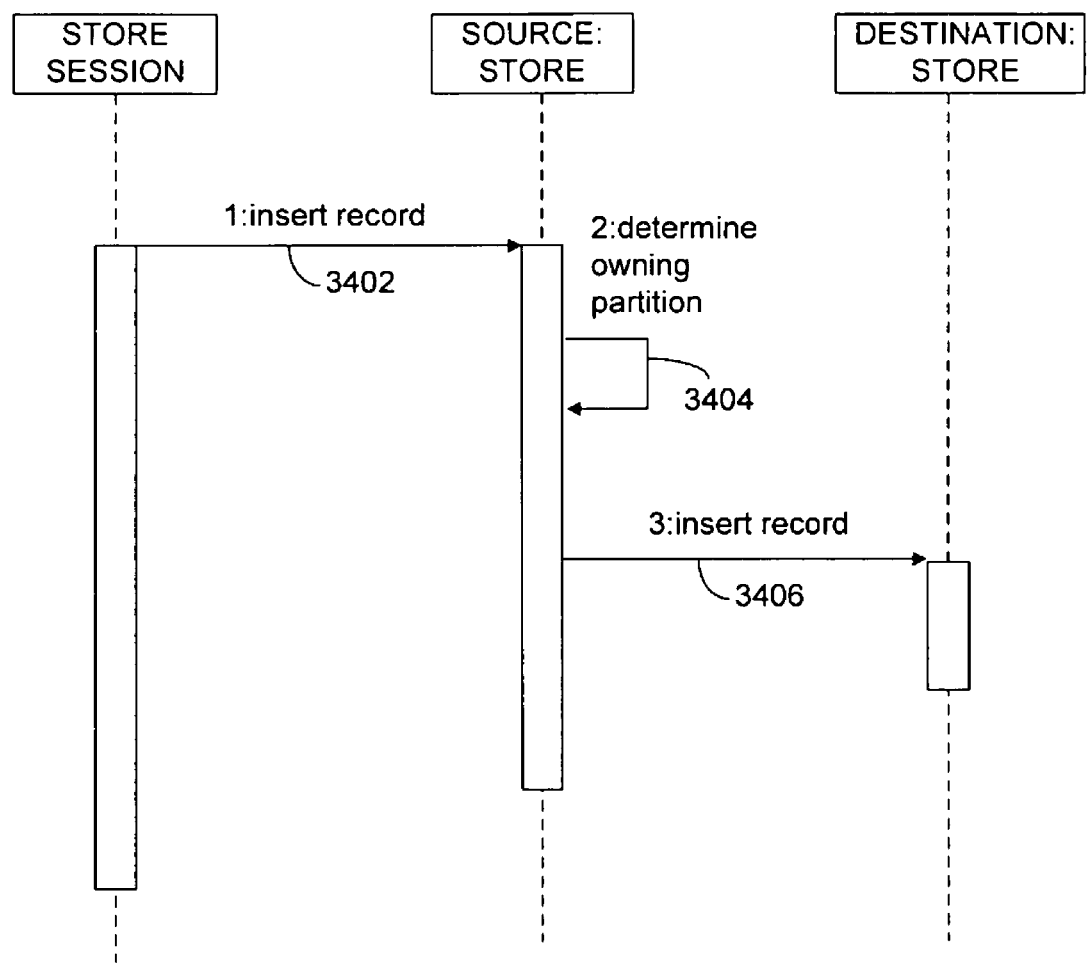
FIG. 34 is a sequence diagram showing illustrative steps for inserting a record for a partitioned store.

When the store on a given node receives a request to insert a record, it uses the partitioning algorithm to determine which partition owns the given record, and sends it to the store for that partition. For simplicity, FIG. 34 shows this as a direct message, however, one having skill in the art will appreciate that the message is sent through the node communication subsystem, which buffers multiple messages before sending a buffer to the target node, which then forwards the messages to the store for the target partition. As shown in FIG. 34, the store session sends the insert record message to the store (step 3402). The store then determines which partition owns the given record (step 3404), and sends insert record message to the store for that partition (step 3406).

Further, the distributed cache may provide faster writes by returning to the client after recording the updates in memory on two or more independent machines. The updates can then be pushed back to the database in the background.

The scenario for inserting a record is similar for updating and deleting records. That is, the request is forwarded through the node communication subsystem to the appropriate node for that record.

The query processor may handle queries in different manners in the partitioned store depending on the type of query. If the query is a primary key lookup, then the query processor finds the partition that owns the relevant record and forwards the query to the node owning that record. If the query selects an ordered list of records based on the primary key, then the query processor selects the appropriate records from each partition and then combines them into a final result set that it sends to the client. However, if the query is more complicated, involving joins, ordering and filtering that is not based on the primary key, then the query processor creates a temporary data space where it is able to gather data from multiple partitions and merge them together into a result set. The processes for handling these types of queries are known in the art, such as the processes used by HADB, and will not be described in more detail herein.

A transaction in a partitioned database is a distributed transaction, and a two-phase commit approach may be used to commit the transaction.

A partitioned store can be highly available if it is also replicated. In the illustrative example, the behavior and mechanisms for takeover, repair, and recovery are the same for a replicated store with multiple partitions as with a replicated store with a single partition. However, in a partitioned store, the store is running as a server, and therefore a node manager is provided.

As described above, in the illustrative example, the HADB partitioning scheme may be implemented to determine to which partition a record belongs. The HADB partitioning scheme locates items based on characteristics. For example, HADB partitioning may partition using a hash function that is based on a primary key, which is a unique identifier for rows in a database, comprising a column or a group of columns, that is used to determine the partition in which a row of data is stored. For example, the primary key may be a project name or employee number. In an illustrative example, when the primary key is an employee number, data for a first group of employees may be partitioned to a first cache, while data for a different group of employees may be partitioned to a second cache. Further, the store may keep track of the version of data in a cache or database. For example, the store may associate a version number or time stamp with data entries.

As discussed above, the CPI adaptor may expose an object interface to its clients, and may perform object-relational mapping of data that is sent to the store or that has been retrieved from the store via the CPI adaptor. Therefore, the CPI adaptor may provide an object view to the client while caching relational data. For example, the CPI adaptor may provide a JAXB view and perform JAXB-relational mapping. Further, the relational cache may be optimized for object-relational mapping, such as by pre-computing foreign key references or in an alternative manner.

A plurality of CPI adaptors may be implemented to provide access to a cache via a plurality of data models simultaneously. For example, different CPI adaptors may provide object access, SQL access, and JAXB access to the cache. One or more of the CPI adaptors may provide different mappings, for example, for different classes. For example, a CPI adaptor may provide different views of the same employee table for employee1 class and employee2 class. Further, the CPI adaptors may access an in-memory database via a plurality of data models or mappings. For example, when a distributed cache is used in connection with a distributed in-memory database, data may be partitioned based on data type or table. Different data models may be used within the same cache or in-memory database as well as between cache and in-memory database partitions.

Thus, methods, systems, and articles of manufacture consistent with the present invention provide a memory-based relational data store that can act as a cache to a backend relational database or as a standalone in-memory database. The store can run as a cache in the same virtual memory as an application, or it can run as a separate process. The data store provides extremely fast reads, because it avoids the overhead of RDBMS layers. Further, the data store provides extremely fast updates, because updates need not be pushed to disk if the store is mirrored across two machines. A transaction commit can be performed by updating both the primary and standby stores.

When the data store acts as a cache for one or more backend databases, a high commit performance can be achieved with transactional integrity, compared to conventional single-system caches that require data to be transferred from the client that made the update all the way through to the server's disk before acknowledging a commit. When the data store acts as a standalone in-memory database, it either writes the committed data through to a backing store or writes the data to a standby replica and thus avoids write through to a disk.

The foregoing description of an implementation of the invention has been presented for purposes of illustration and description. It is not exhaustive and does not limit the invention to the precise form disclosed. Modifications and variations are possible in light of the above teachings or may be acquired from practicing the invention. For example, the described implementation includes software but the present implementation may be implemented as a combination of hardware and software or hardware alone. The invention may be implemented with both object-oriented and non-object-oriented programming systems. The scope of the invention is defined by the claims and their equivalents.

What is claimed is:

1. A method for managing an in-memory database, the method comprising the steps of:
   distributing a database cache of said in-memory database over at least two of a plurality of independent sub data processing systems by (a) partitioning the database cache over the at least two sub data processing systems; and (b) replicating at least one of the partitions over the at least two sub data processing systems;
   performing a transaction commit by updating both one of the partitions and a corresponding replication thereof;
   synchronizing the database with information in the database cache using a resolution rule;
   updating a first information in the database; and
   updating the database cache with the first information responsive to updating the first information in the database.

2. The method of claim 1, further comprising the steps of:
   storing information in at least one of the database and the database cache in a relational format; and
   mapping the information to a non-relational data model.

3. The method of claim 1, wherein a first information in the database cache is associated with a first synchronization strategy and a second information in the database cache is associated with a second synchronization strategy.

4. The method of claim 1, further comprising the step of:
   synchronizing the database with information in the database cache asynchronous to committing a transaction.

5. The method of claim 1, further comprising the step of:
   updating a first information in the database cache on at least two of the plurality of data processing systems.

6. The method of claim 1, further comprising the step of:
   after updating an information in the database cache, updating the database with the information.

7. The method of claim 6, wherein the database is updated with the information without determining whether the information in the database cache is a most-recent version of the information.

8. The method of claim 6, further comprising the step of:
   prior to committing a transaction, determining whether at least one of the database cache and the database contains a current information.

9. The method of claim 1, wherein the database cache is a database for another database cache.

10. The method of claim 1, further comprising recovering a first partition by sending a data image from a replication of the first partition to the first partition using remote direct memory access.

11. The method of claim 1, further comprising the step of:
accessing the database cache using a plurality of data models.

12. The method of claim 1, wherein the distributing step comprises replication of an entirety of the database cache such that each partition of the database cache and each corresponding replicated partition are not disposed in the same sub data processing system.

13. The method of claim 1, further comprising maintaining the replication of the at least one partition of the database cache such that no replicated partition is divided between two or more sub data processing systems.

14. The method of claim 1, wherein for each partition, the entirety of the partition is located in a single independent sub data processing system, wherein the replicating step comprises replicating the at least one of the partitions such that:
the entirety of the replicated partition is located in a single independent sub data processing system; and
each replicated partition and each corresponding partition of the database cache are not disposed in the same independent sub data processing system.

15. The method of claim 1, wherein each partition and each replicated partition are directly accessible by each one of the at least two sub data processing systems.

16. The method of claim 14, wherein the distributing step comprises replicating each one of the partitions over the at least two sub data processing systems.

17. A method for managing an in-memory database, the method comprising the steps of:
distributing a database cache of said in-memory database over at least two of a plurality of independent sub data processing systems by partitioning the database cache over the at least two sub data processing systems and replicating at least one partition over the at least two sub data processing systems;
performing transactions between the database cache and a plurality of databases in accordance with a partitioning of the database cache over the plurality of databases, wherein a first information in the database cache is associated with a first synchronization strategy and a second information in the database cache is associated with a second synchronization strategy;
synchronizing the database with information in the database cache using a resolution rule;
updating a first information in the database; and
updating the database cache with the first information responsive to updating the first information in the database.

18. A computer-readable storage medium containing instructions that cause a data processing system having a program to perform a method for managing an in-memory database, the data processing system having a plurality of independent sub data processing systems, the method comprising the steps of:
distributing a database cache of said in-memory database over at least two of a plurality of sub data processing systems by (a) partitioning the database cache over the at least two sub data processing systems; and (b) replicating at least one of the partitions over the at least two sub data processing systems;
performing a transaction commit by updating both one of the partitions and a corresponding replication thereof;
synchronizing the database with information in the database cache using a resolution rule;
updating a first information in the database; and
updating the database cache with the first information responsive to updating the first information in the database.

* * * * *